United States Patent
Lagerholm et al.

(10) Patent No.: US 11,695,679 B1
(45) Date of Patent: Jul. 4, 2023

(54) PERFORMANCE TESTING USING A REMOTELY CONTROLLED DEVICE

(71) Applicant: T-Mobile USA, Inc., Bellevue, WA (US)

(72) Inventors: Stephan Lagerholm, Yarrow Point, WA (US); Alan MacDonald, Bellevue, WA (US); Sylvester Nowak, Mercer Island, WA (US); Ryan Colter, Bellevue, WA (US); Timur Kochiev, Snoqualmie, WA (US); Egil Gronstad, Encinitas, CA (US); Elisabeth Mansfield, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 205 days.

(21) Appl. No.: 17/187,595

(22) Filed: Feb. 26, 2021

(51) Int. Cl.
| | |
|---|---|
| *H04L 43/50* | (2022.01) |
| *H04L 41/22* | (2022.01) |
| *H04L 43/045* | (2022.01) |
| *H04W 16/18* | (2009.01) |
| *H04W 24/06* | (2009.01) |
| *H04W 84/04* | (2009.01) |

(52) U.S. Cl.
CPC .............. *H04L 43/50* (2013.01); *H04L 41/22* (2013.01); *H04L 43/045* (2013.01); *H04W 16/18* (2013.01); *H04W 24/06* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 9,924,386 B2 * | 3/2018 | Jain | H04L 65/1059 |
| 10,097,439 B1 * | 10/2018 | Cai | H04W 4/025 |
| 10,638,409 B2 * | 4/2020 | Ketonen | H04W 48/16 |
| 2011/0219111 A1 * | 9/2011 | Shevenell | G06F 15/173 709/224 |
| 2013/0267179 A1 * | 10/2013 | Parekh | H04L 41/22 455/67.11 |

(Continued)

FOREIGN PATENT DOCUMENTS

| | | | | |
|---|---|---|---|---|
| CN | 1253459 A | * | 5/2000 | ............ H04W 24/02 |
| JP | 2007534208 A | * | 11/2007 | |

*Primary Examiner* — Ajit Patel
(74) *Attorney, Agent, or Firm* — Barta, Jones & Foley, PLLC

(57) ABSTRACT

Examples provide a network testing solution using a remote-controlled testing device. A test device includes a computing device for executing network performance testing logic and a cellular device. The test device controls the cellular device via a series of commands issued to the cellular device by the computing device. The test device is placed onto or inside a vehicle. As the vehicle moves through a geographical area, the test device automatically and autonomously performs network testing operations. The test data generated during the test is periodically uploaded to a central controller. The central controller aggregates test data received from a plurality of test devices assigned to a plurality of vehicles for a given campaign. The aggregated test data is analyzed and filtered to generate performance test results. A user can dynamically set up each campaign and assign test devices and vehicles to each campaign using a graphical user interface.

20 Claims, 23 Drawing Sheets

(56) References Cited

U.S. PATENT DOCUMENTS

| | | | | |
|---|---|---|---|---|
| 2017/0302545 | A1* | 10/2017 | Lachwani | G06F 8/41 |
| 2017/0339630 | A1* | 11/2017 | Ketonen | H04W 24/04 |
| 2018/0365133 | A1* | 12/2018 | Mitchell | G06F 8/71 |
| 2018/0367940 | A1* | 12/2018 | Kwong | H04L 67/52 |
| 2018/0368010 | A1* | 12/2018 | Mitchell | H04L 41/0645 |
| 2020/0169453 | A1* | 5/2020 | Cheng | G06F 11/0709 |
| 2020/0322826 | A1* | 10/2020 | Wangler | H04W 24/04 |

* cited by examiner

PERFORMANCE TESTING USING A REMOTELY CONTROLLED DEVICE

BACKGROUND

Network performance testing is typically carried out by a human engineer or technician manually operating testing equipment in real-time as the test is carried out. For tests carried out within a moving vehicle, the testing can require multiple human operators to drive the vehicle and manage the testing equipment. Moreover, specialized testing equipment and testing software can result in extensive testing costs. Thus, traditional manual network testing is frequently an expensive, inefficient, and labor-intensive process.

SUMMARY

Some examples provide a system for network performance testing. The system includes a cellular device for sending and receiving calls and/or data via a cellular network and a computer-readable medium storing instructions that are operative upon execution by a processor to receive campaign-specific performance test logic from a cloud server. The performance test logic includes instructions for running a network performance test associated with a selected test campaign. The system automatically initiates the network performance test using the cellular device in accordance with the performance test instructions. The system obtains test data generated during performance of the network performance test within a selected geographical area from the cellular device. The system transmits the test data to the cloud server via the cellular telephone network in response to an occurrence of a predetermined event. The cloud server automatically evaluates an aspect of the cellular telephone network performance based on an analysis of the test data.

Other examples provide a method for network performance testing. A test device associated with a vehicle receives performance test logic including testing instructions for running the network performance test associated with a selected test campaign. The network performance test is automatically initiated. The network performance test is carried out at least in part by a cellular device communicatively coupled to the test device. The network performance test is performed while the vehicle is moving throughout at least a portion of a selected geographical area. The test device sends command(s) to the cellular device to control the cellular device in accordance with the testing instructions. Test data is created based on performance data obtained from the cellular device during performance of the network performance test. The test data is transmitted to a remote computing device in response to an occurrence of a per-campaign upload interval.

Still other examples provide one or more computer storage devices having computer-executable instructions for automatic network performance testing that, upon execution by a processor, cause the processor to perform operations comprising initiating a first network performance test automatically in accordance with first performance test instruction in response to receiving first performance test logic associated with a vehicle assigned to a first test campaign. The first test data generated during the first network performance test is transmitted to the cloud server via the cellular network in response to an occurrence of a first upload interval. The vehicle is reassigned to a second campaign. A second network performance test is automatically initiated in accordance with second performance test instruction in response to receiving second performance test logic associated with the second test campaign. The second test data is transmitted to the cloud server via the cellular network in response to occurrence of a second upload interval.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
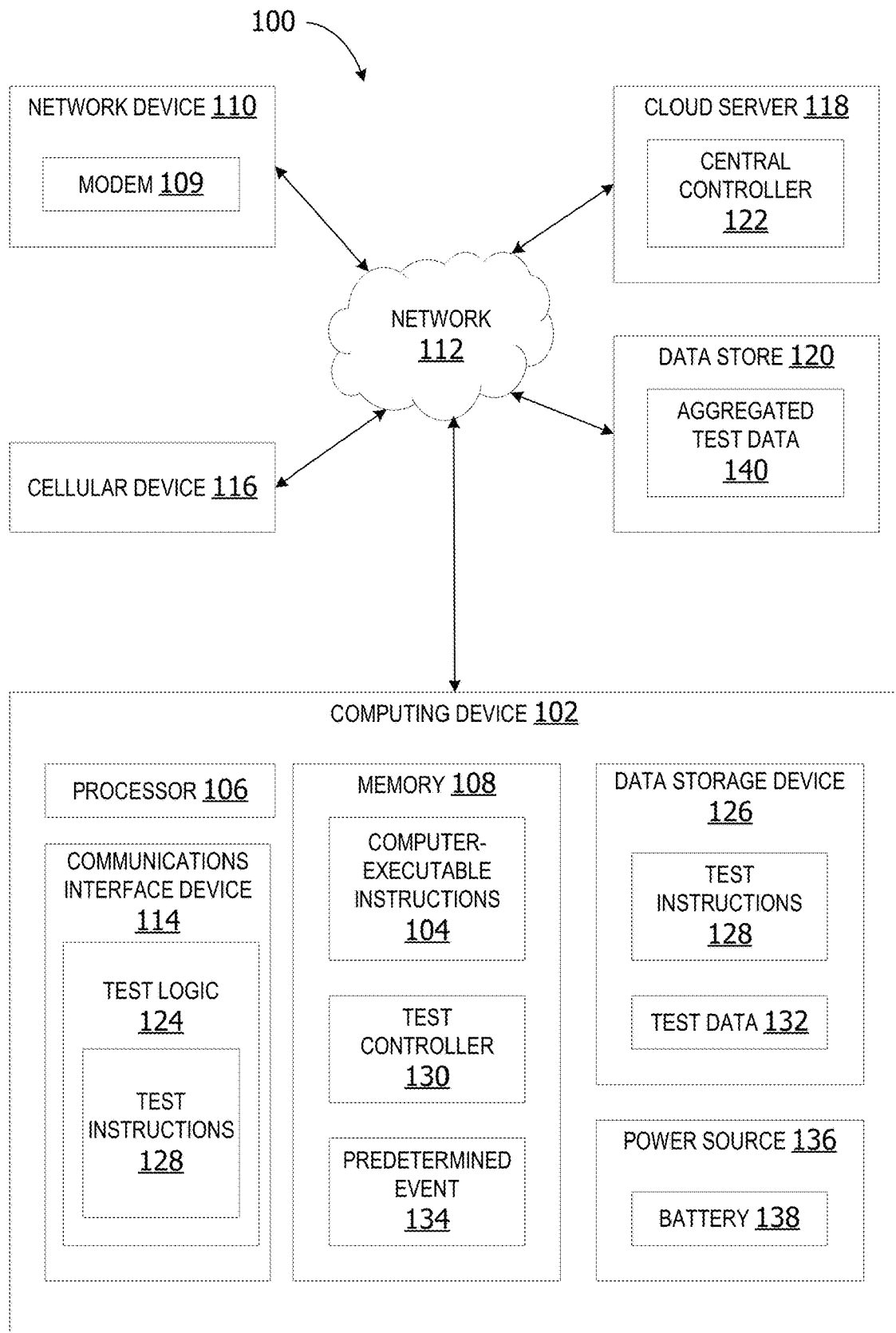
FIG. 1 is an exemplary block diagram illustrating a system for network performance testing using a remote-controlled test device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Currently, many cellular telephone networks are adopting fifth generation (5G) technical standards for their broadband cellular networks. These networks are continually expanding and improving their network speed and capacity. These changes necessitate increasing network testing requirements. Moreover, in some circumstances the federal communications commission (FCC) mandates various network performance testing for cellular telephone carriers. In some cases, implementing network performance testing can incur costs associated with physical testing equipment, software licensing for testing software, server capability and capacity, network transport and third-party drive test labor. Thus, the costs associated with third-party testers for 5G and FCC testing can be extensive. Moreover, the need to perform significant, geographically diverse performance testing of networks, such as 4G and 5G networks, is likely to increase over time.

Aspects of the disclosure provide more efficient testing at a decreased cost. This enables more testing to be performed. The increased testing can provide benefits such as improving performance of 5G networks; improving network structures and providing quality assurance for networks now and in the future.

Examples of the disclosure enable automatic network performance testing using remotely controlled testing devices. In some examples, the test device automatically performs networking testing using a portable and remote-controlled test device. This enables reduced network performance testing costs and greater testing efficiency.

The disclosed system is scalable where the central controller can support thousands of testing vehicles. This enables the system to easily scale upwards to support any number of vehicles, such as thousands of vehicles.

Aspects of the disclosure further enables a low-cost network performance testing using a remotely controlled device. The test computing device operates in an unconventional manner by automatically controlling a cell phone during performance of network testing to automatically generate test results without intervention by human users. In this manner, the test computing device is used in an unconventional way, and allows low cost, automated network performance testing.

In other examples, the testing devices are compact, portable network performance devices which can be deployed in any type of vehicle operated by any type of driver, without requiring special training or technical expertise of the operator. In this manner, the system reduces costs by eliminating the need for trained experts, specialized vehicles, or dedicated testing contractors.

Referring again to FIG. 1, an exemplary block diagram illustrates a system 100 for network performance testing using a remote-controlled test device. In the example of FIG. 1, the computing device 102 represents any device executing computer-executable instructions 104 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, and/or portable media player. Additionally, the computing device 102 can represent a group of processing units or other computing devices. In some non-limiting examples, the computing device 102 is implemented as a Raspberry Pi® single board computer.

In some examples, the computing device 102 has at least one processor 106 and a memory 108. The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 15, FIG. 16, FIG. 17, and FIG. 18).

The computing device 102 further has one or more computer-readable media, such as the memory 108. The memory 108 includes any quantity of media associated with or accessible by the computing device 102. The memory 108, in these examples, is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

The network 112 is implemented by a network device 110. The network device 110 includes one or more physical network components, such as, but without limitation, routers, switches, network interface cards (NICs), and other network devices. In some examples, the network device 110 includes a modem 109, such as, but not limited to, a long-term evolution (LTE) modem.

In this example, the network device 110 is a separate, stand-alone device. In other examples, the network device 110 is integrated within the computing device 102.

In some examples, the network device 110 is a device for creating an LTE or 5G hotspot within the test device, an IoT device or a component inside the cellular device. This enables the system to control a Wi-Fi hotspot.

The network 112 is any type of network for enabling communications with remote computing devices, such as, but not limited to, a wireless (Wi-Fi) network, or any other type of network. In this example, the network 112 is a cellular telephone network.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a cellular device 116, the network device 111, a cloud server 118 and/or a data store 120, can occur using any protocol or mechanism over any wired or wireless connection. In some examples, the communications interface component 114 is operable with short range communication technologies such as by using near-field communication (NFC) tags.

The cellular device 116 is a device capable of receiving and transmitting messages over a cellular network. In some examples, the cellular device 116 is a phone, such as a cellular telephone device capable of making and receiving phone calls and/or data when the phone is within a cellular network service area. The cellular device may be referred to as a mobile phone, a cell phone, a cellular phone, a cellular telephone, a portable telephone, and/or a smart phone. In this example, the cellular device 116 is a separate, stand-along device which is communicatively coupled to the computing device 102. However, in other examples, the cellular device 116 is integrated into the computing device 102 and/or integrated into a vehicle.

The cloud server 118 is a logical server providing services to the computing device 102 or other clients. The cloud server 118 is hosted and/or delivered via a network, such as, but not limited to, the network 112. In some non-limiting examples, the cloud server 118 is associated with one or more physical servers in one or more data centers. In other examples, the cloud server 118 is associated with a distributed network of servers. The cloud server 118, in this example, hosts a central controller 122 for managing one or more test campaigns associated with one or more test devices for performing network performance testing.

In some examples, the central controller 122 manages a large cohort of remote test equipment (campaigns and fleets of vehicles with on-board testing equipment) providing centralized control of multiple remote-controlled testing devices (computing device 102) testing a given network. In other words, the device combining the phone and computing device provides the centralized control for the remote-control testing.

In some non-limiting examples, the cloud server is implemented within a cloud server or other cloud-based platform which allows the system to create and deploy a complex system for configuration, data ingestion, central storage, and final presentation of performance test results.

The data store 120 is a cloud storage, database, or other data store for storing data, such as, but not limited to, aggregated test data 140. The aggregated test data is test data generated by one or more test devices during performance of tests associated with one or more test campaigns. In some non-limiting examples, the data store 120 is implemented as a database (DB) to centralize storage of field-captured data, such as, but not limited to, the per-campaign aggregated test data 140.

The central controller 122, in some non-limiting examples, downloads test logic 124 from the cloud server (central control) and/or the data store, to the test computing device 102. The test logic 124 includes campaign-specific test instructions 128 for performing one or more network performance tests associated with a given campaign. The test controller 130 implements the one or more performance tests in accordance with the test instructions 128. The test controller 130 generates test data 132 based on data obtained or otherwise gathered from the cellular device during performance of the tests.

The data gathered from the cellular device 116 includes any type of data which can be obtained from the cellular device. The data can include, without limitation, global positioning satellite (GPS) location data, signal strength, time, and/or speed test logs. Other data which can optionally be gathered from the cellular device 116 includes running processes, CPU usage, battery and power logs, Bluetooth™ and Wi-Fi related information, operating system (OS) version, disk/storage data, and/or sensor information. The disk/storage data can include the amount of storage space used. The sensor information obtained from the cellular device can include data associated with a gyroscope, accelerometer, magnetometer, ambient light detector, used space sensor information, and/or temperature data.

In other examples, data gathered from the cellular device 116 includes additional network information, such as received signal strength indicator (RSSI), received signal signal-to-noise ratio (RSSNR), and/or channel quality indicator (CQI) data. The data obtained from the cellular device, in still other examples, includes LTE status and active features, such as, but not limited to, carrier aggregation, roaming, emergency services, status and active features.

The test data 132 generated by the test controller is data describing performance of the cellular device 116 and/or the network 112 within a particular geographic region during the testing. The test data 132, in some examples, is data associated with one or more attributes of the network performance. An attribute of network performance can include, for example but without limitation, network speed, coverage, signal strength, signal-to-noise ratio, signal clarity, location of the data collected, and the like.

In some example, the test controller uploads the test data 132 back to the central controller as the test data is generated. In other examples, the test controller 130 uploads the test data 132 to the central controller periodically, such as, at the occurrence of a predetermined event 134. The predetermined event 134 can include an event such as, but not limited to, an occurrence of a predetermined time-interval, conclusion of a performance test, de-activation of the cellular device, a low battery warning, or any other user-configured predetermined event. In other examples, the test data is stored in a local physical data storage device 126 until the test data 132 is uploaded to the cloud server 118.

The data storage device 126 is optionally a device for storing data, such as, but not limited to the test instructions 128 and/or the test data 132. The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database.

The data storage device 126, in this example, is included within the computing device 102, attached to the computing device, plugged into the computing device, or otherwise associated with the computing device 102. In other examples, the data storage device 126 includes a remote data storage accessed by the computing device 102 via the network 112, such as a remote data storage device, a data storage in a remote data center, or a cloud storage.

The system analyzes test data generated during performance of the test(s) to identify network outages, signal strength, speed, signal to noise ratio, signal strength, etc. The data can be filtered in accordance with one or more filters to focus the data. In some examples, the data fields associated with the generated performance data read from the cellular device and the test data generated by the test controller includes reference signals received power (RSRP), reference signals received quality (RSRQ) measures of signal strength, the latitude and longitude location data, speed up and speed down values, and more data fields can be added as the number of testing devices and/or vehicles utilized by the system scales up.

In the example shown in FIG. 1, the cellular device 116 and the network device 110 are separate device from the computing device 102. In other examples, the computing device 102 includes the cellular device 116 and the network device 110 are integrated within the computing device 102.

Figure 2:
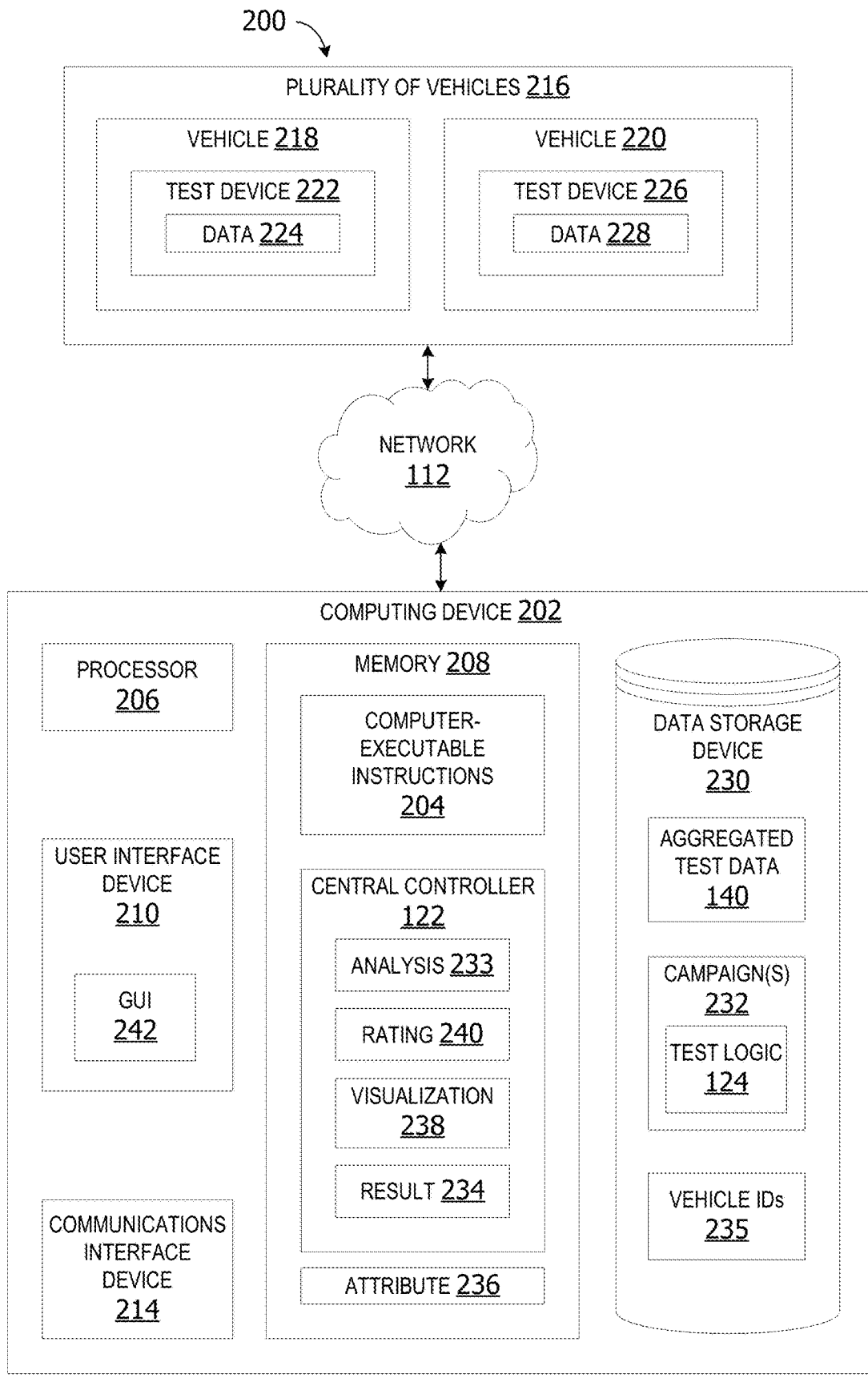
FIG. 2 is an exemplary block diagram illustrating a system for network performance testing using a plurality of testing devices associated with a plurality of vehicles.

FIG. 2 is an exemplary block diagram illustrating a system 200 for network performance testing using a plurality of testing devices associated with a plurality of vehicles. The computing device 202 represents any device executing computer-executable instructions 204 (e.g., as application programs, operating system functionality, or both) to implement the operations and functionality associated with the computing device 202. The computing device 202, in some examples, includes a mobile computing device or any other portable device. Additionally, the computing device 202 can represent a group of processing units or other computing devices. In other examples, the computing device 202 is implemented as a cloud device, such as, but not limited to, the cloud server 118 in FIG. 1.

In some examples, the computing device 202 has at least one processor 206 and a memory 208. The computing device 202 in other examples includes a user interface device 210.

The processor 206 includes any quantity of processing units and is programmed to execute the computer-executable instructions 204. The computer-executable instructions 204 is performed by the processor 206, performed by multiple processors within the computing device 202 or performed by a processor external to the computing device 202. In some examples, the processor 206 is programmed to execute instructions such as those illustrated in the figures (e.g., FIG. 19, FIG. 20, FIG. 21, FIG. 22, and FIG. 23).

The computing device 202 further has one or more computer-readable media such as the memory 208. The memory 208 includes any quantity of media associated with or accessible by the computing device 202. The memory 208, in these examples, is internal to the computing device 202 (as shown in FIG. 2). In other examples, the memory 208 is external to the computing device (not shown) or both (not shown). The memory 208 can include read-only memory and/or memory wired into an analog computing device.

The memory 208 stores data, such as one or more applications. The applications, when executed by the processor 206, operate to perform functionality on the computing device 202. The applications can communicate with counterpart applications or services such as web services accessible via a network 112. In an example, the applications represent downloaded client-side applications that correspond to server-side services executing in a cloud.

In other examples, the user interface device 210 includes a graphics card for displaying data to the user and receiving data from the user. The user interface device 210 can also include computer-executable instructions (e.g., a driver) for operating the graphics card. Further, the user interface device 210 can include a display (e.g., a touch screen display or natural user interface) and/or computer-executable instructions (e.g., a driver) for operating the display. The user interface device 210 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 202 in one or more ways.

In some examples, the system 200 optionally includes a communications interface component 214. The communications interface component 214 includes a network interface card and/or computer-executable instructions (e.g., a driver) for operating the network interface card. Communication between the computing device 202 and other devices, such as but not limited to one or more test devices associated with a plurality of vehicles 216, can occur using any protocol or mechanism over any wired or wireless connection. In some examples, the communications interface component 214 is operable with short range communication technologies such as by using near-field communication (NFC) tags.

The plurality of vehicles 216 includes one or more vehicles in a fleet of vehicles. In this example, the plurality of vehicles 216 includes a first vehicle 218 and a second vehicle 220. A vehicle in the plurality of vehicles may be implemented as any type of vehicle. A vehicle can include a truck, van, bus, compact car, four door car, two door car, a three wheeled vehicle, a two wheeled vehicle, unmanned vehicle, aerial vehicle, or any other type of vehicle.

In this example, the plurality of vehicles 216 includes vehicle 218 and vehicle 220. However, the examples are not limited to two vehicles. The plurality of vehicles can include three or more vehicles, or any number of vehicles.

Each vehicle in the plurality of vehicles 216 includes a test device. In some examples, the test device associated with each vehicle may be mounted to the roof of the vehicle, placed within a storage area of the vehicle, or carried within a passenger compartment of the vehicle. A storage area of a vehicle can include a trunk space or compartment within the passenger compartment. If the test device is located within the passenger compartment, the test device can be placed on the floorboard or on a passenger seat. A test device on a passenger seat can be secured in place with a seatbelt or other means for securing the device in place during vehicle motion.

In other examples, a test device may be incorporated into the plurality of vehicles, such as through on-board computing devices and/or on-board cellular devices. In still other examples, a test device may be partially incorporated into the plurality of vehicles, such as through use of on-board computing devices and/or on-board cellular devices.

In one example, the test device 222 associated with the vehicle 218 can be mounted to the roof of the vehicle or stored within the trunk or passenger compartment of the vehicle. When performance testing begins, the test device 222 generates test data 224. The test device 226 associated with the vehicle 220 may be mounted to the roof of the vehicle or stored within the trunk or passenger area of the vehicle. The test device 226 generates test data 228 during execution of one or more network performance tests performed by the test device.

The system 100 can optionally include a data storage device 230 for storing data, such as, but not limited to the aggregated test data 140, data associated with one or more campaign(s) 232 and/or vehicle identifiers (IDs) 235 associated with the plurality of vehicles 216. In this example, each vehicle in the plurality of vehicles is assigned a unique vehicle ID. One or more vehicles in the plurality of vehicles are assigned to a testing campaign. The test logic 124 associated with a selected campaign is transmitted to each test device on each vehicle assigned to the testing campaign. The test devices on the assigned vehicles carry out performance testing in accordance with the instructions obtained from the test logic 124. The test data generated during the tests is then transmitted back to the central controller 122.

The data storage device 230 can include one or more different types of data storage devices, such as, for example, one or more rotating disks drives, one or more solid state drives (SSDs), and/or any other type of data storage device. The data storage device 230 in some non-limiting examples includes a redundant array of independent disks (RAID) array. In other examples, the data storage device 230 includes a database.

The data storage device 230 in this example is included within the computing device 202, attached to the computing device, plugged into the computing device, or otherwise associated with the computing device 202. In other examples, the data storage device 230 includes a remote data storage accessed by the computing device via the network 112, such as a remote data storage device, a data storage in a remote data center, or a cloud storage.

In some examples, the central controller 122 performs analysis 233 on the aggregated test data 140 received from the test devices assigned to a given campaign. The analysis result 234 indicates overall performance of the network with regard to at least one attribute of the network 112. The result 234 may be presented (output) via a visualization 238 displayed in a graphical user interface (GUI). The result may also include a rating 240 or other performance metric ranking the performance of one or more attributes of the network. An attribute of the network is any type of aspect or characteristic of the network performance, such as, but not limited to, speed, noise, coverage, signal strength, etc.

In some examples, a geographical mapping system is used to fetch data from the data storage device and/or the data store. The system quickly creates a complex map of data points for the visualization 238.

Figure 3:
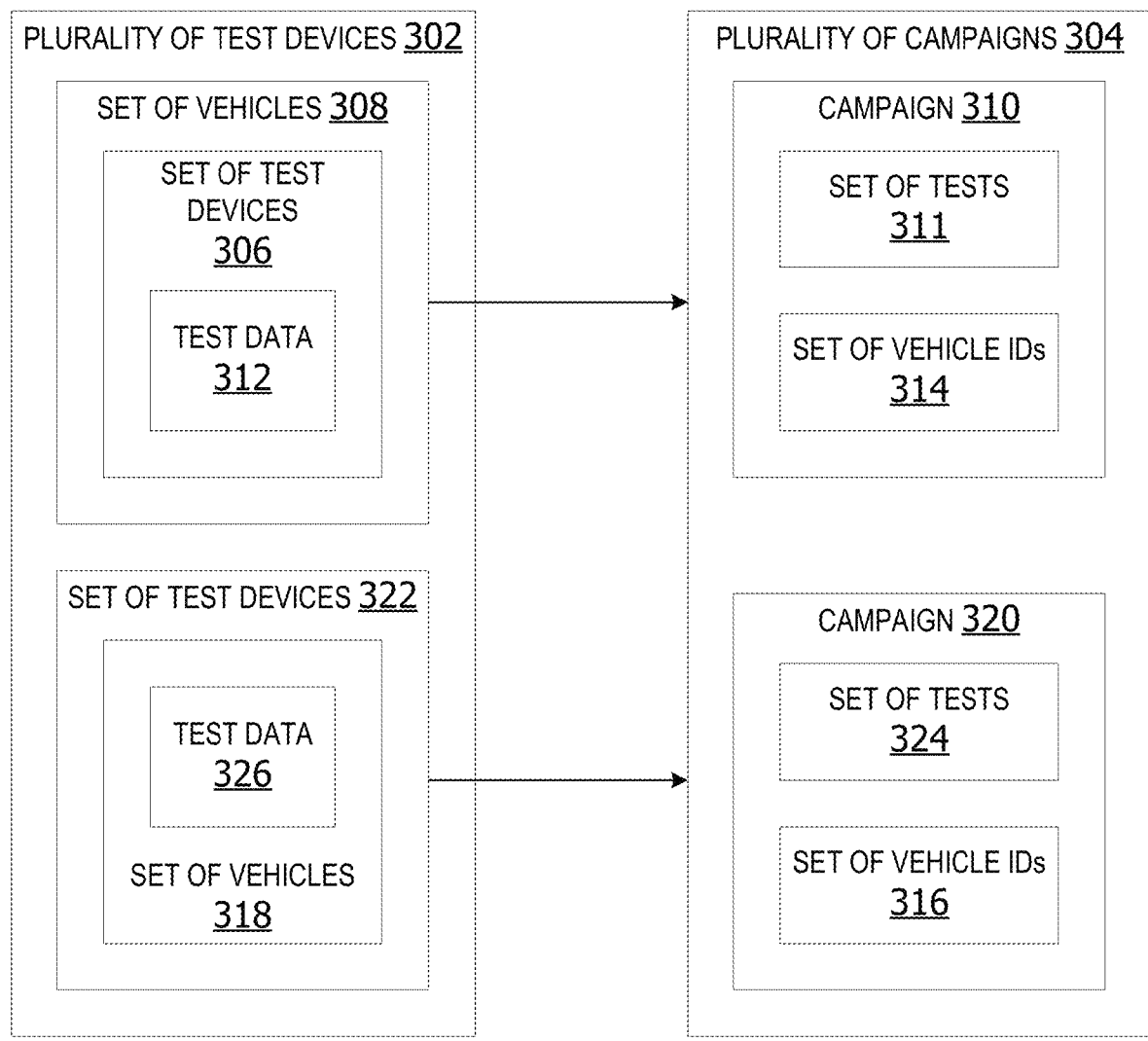
FIG. 3 is an exemplary block diagram illustrating a plurality of test devices associated with a plurality of campaigns.

FIG. 3 is an exemplary block diagram illustrating a plurality of test devices 302 associated with a plurality of campaigns 304. In this example, a set of one or more test devices 306 associated with a set of one or more vehicles 308 are assigned to a first campaign 310. The campaign 310 is a testing campaign associated with testing one or more aspects (i.e., attributes) of a network. The set of test devices 306 assigned to the campaign perform a set of tests 311 while the vehicle(s) are moving through at least a portion of a geographic area associated with the campaign. The set of test devices generate test data 312 for the campaign 310.

In some examples, a vehicle having a test device for executing performance tests is assigned to a given campaign by assigning a vehicle ID for the vehicle to the campaign. Likewise, a test device can be assigned to the campaign by assigning a MAC address or other device ID for the test device to the campaign. In this example, the set of one or more vehicle IDs 314 corresponding to the set of vehicles 308 is assigned to the first campaign 310.

In other examples, a different set of one or more vehicle IDs 316 associated with a set of one or more vehicles 318 is assigned to a second campaign 320. The second campaign is a different campaign than the first campaign. The first campaign 310 and the second campaign 320 may run simultaneously (in parallel) or they may run during different time periods.

In this non-limiting example, the set of test devices 322 perform a set of tests 324 while the set of vehicles 318 are within a given geographical area. The set of test devices 322 generate test data 326 as the tests are being run.

Figure 4:
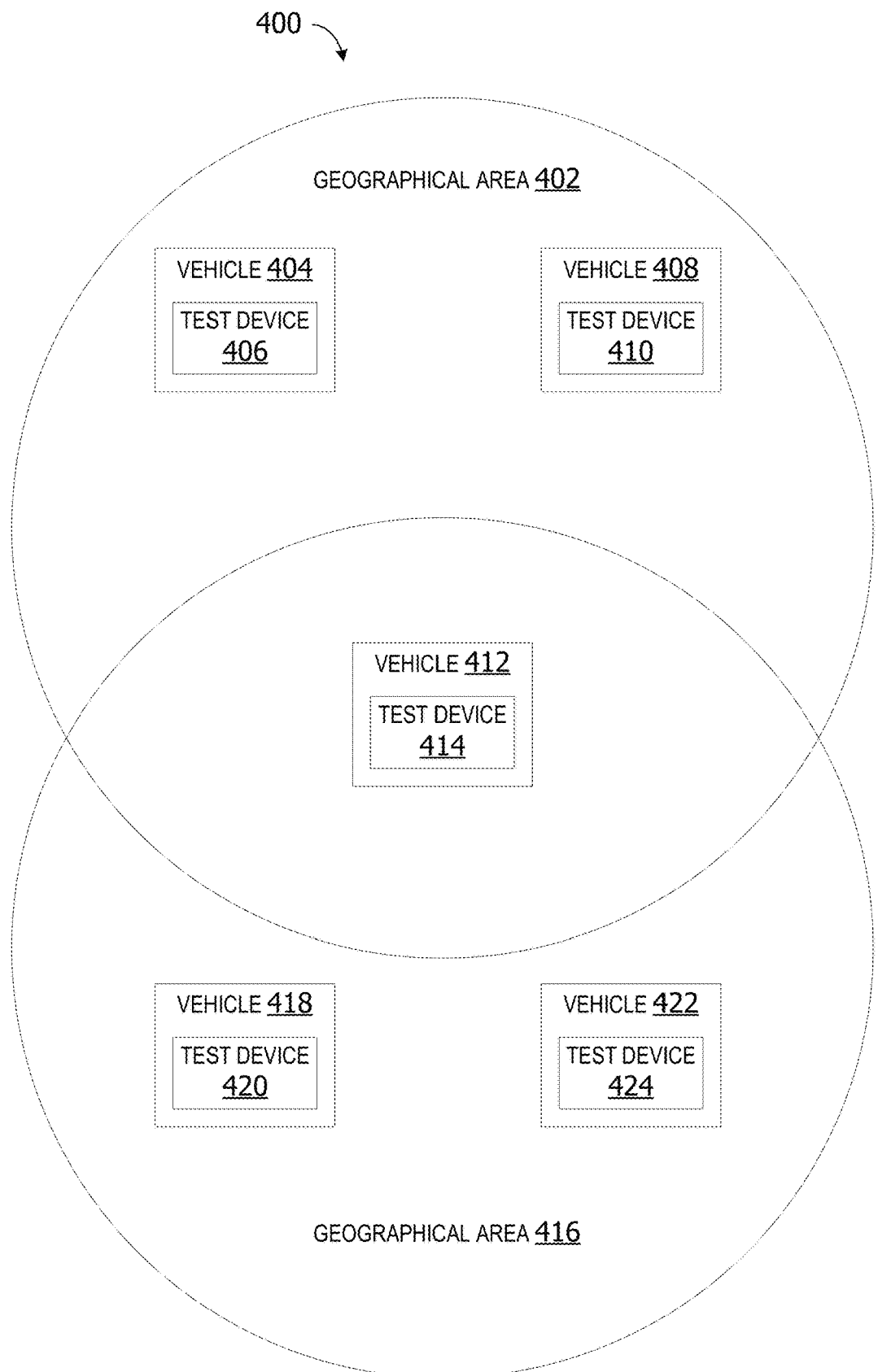
FIG. 4 is an exemplary block diagram illustrating geographical areas associated with a plurality of performance test campaigns.

FIG. 4 is an exemplary block diagram illustrating geographical areas associated with a plurality of performance test campaigns. In this non-limiting example, a first geographical area 402 associated with a first campaign includes a first vehicle 404 having a first test device 406 and a second test vehicle 408 having a second test device 410. A third vehicle 412 includes a third test device 414. The test vehicles move throughout the geographical area during the testing.

There are three vehicles within the geographical area 402. However, the examples are not limited to assigning three vehicles to a campaign geographical area. In other examples, a geographical area may include a single vehicle assigned to a campaign, two vehicles assigned to the campaign, as well as four or more vehicles assigned to the campaign.

A second geographical area 416 in this example includes a first vehicle 418 having a first test device 420 and a second vehicle 422 having a second test device 424. Each vehicle is only assigned to a single campaign. However, if a campaign ends and a vehicle in the ending campaign is qualified to join another campaign, the vehicle may be reassigned to the new campaign.

In this example, the vehicle 412 is assigned to the first campaign being conducted within the first geographical region. However, when the first campaign is completed or terminated, the vehicle 412 can receive reassignment to the second campaign being conducted within the second geographical region.

The vehicle 412, in this example, is reassigned to the second campaign because the vehicle is already within the second geographical area. However, the vehicle 404 and/or the vehicle 408 can also be reassigned to the second campaign as well. In this example, the vehicle 404 and/or the vehicle 408 leave the first geographical area and move into the second geographical area to participate in the second campaign if they are reassigned to the second campaign.

In this example, one test device is included in each vehicle. However, in other examples, multiple test devices may be included within a single vehicle. For example, the first vehicle 404 can optionally include two or more test devices associated with the vehicles. The test devices can be mounted on the vehicle or included within the vehicle.

Figure 5:
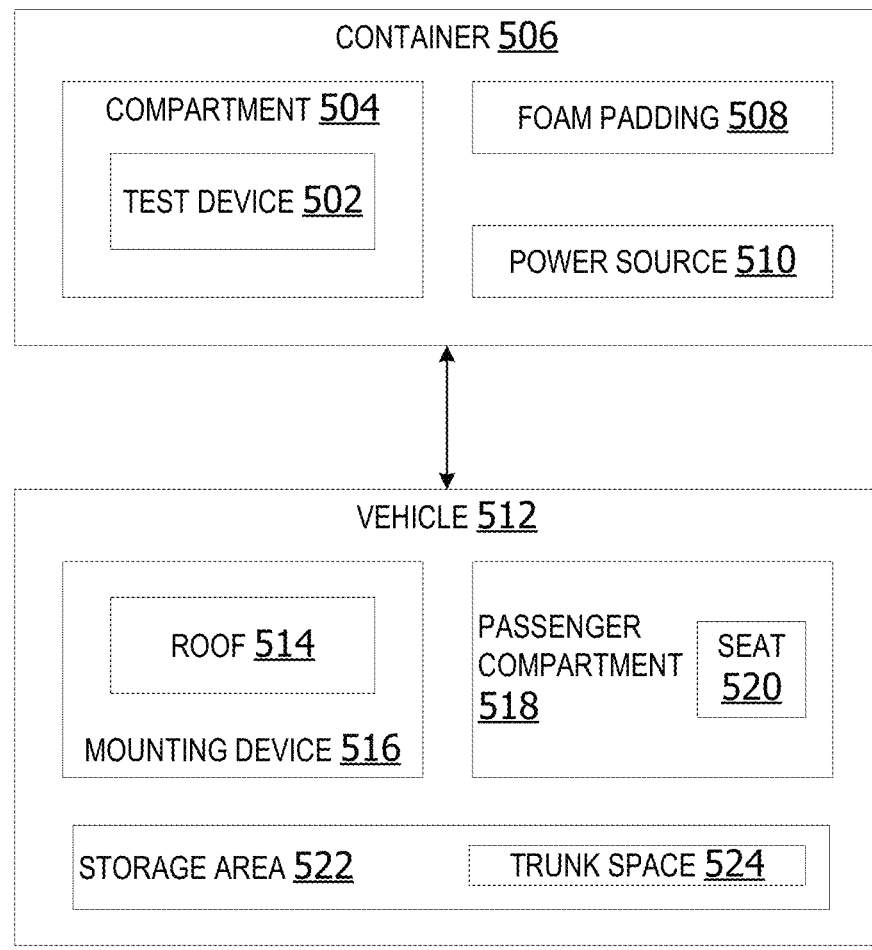
FIG. 5 is an exemplary block diagram illustrating a test device associated with a vehicle.

FIG. 5 is an exemplary block diagram illustrating a test device 502 associated with a vehicle 512. The test device 502, in some examples, is stored within an interior compartment 504 of a waterproof container 506. The container 506 optionally includes a hinged lid, a handle and/or a locking mechanism. Foam padding 508 is provided within the compartment to stabilize the test device 502 and prevent it from being jostled inside the container. In other words, the foam padding protects the test device from damage.

A power source 510 can also be provided. The power source 510 can include a cigarette lighter receptacle which the test device 502 may connect to via power cord or other suitable plug, such as, but not limited to, a USB port and/or an AC adapter. The power source can also be implemented as one or more batteries and/or one or more solar panels.

The container 506 can be mounted to a roof 514 of the vehicle 512 via a mounting device 516. The container 506, in other examples, is placed within the passenger compartment 518 of the vehicle 512. In this example, the container 506 can be strapped into place on a seat 520, such as a passenger seat or back seat. The roof, in some examples, is optimal from a signal perspective, whereas the trunk or the front seat lowers the likelihood of theft or sabotage.

The power source 510 utilized to power the test device varies depending on the location in which the test device is mounted on the vehicle or placed within the vehicle. For example, if the device is mounted on the roof of the vehicle, the power source can include a battery and/or solar panels. In other examples, if the test device is placed within a storage space (trunk) or passenger compartment of the vehicle, the power source 510 can include a cigarette lighter, battery, USB port, AC adapter or other power supply available within the vehicle. If the test device is placed near a window within the passenger compartment, solar panels (solar power) may also be utilized.

The container 506, in other examples, can be placed into a storage area 522, such as, but not limited to, a trunk space 524 (boot). The storage area 522 can also include a pickup bed, a storage box in the pickup bed, a compartment on a motorcycle, a rack on a back of a motorcycle or any other storage area on a vehicle.

Figure 6:
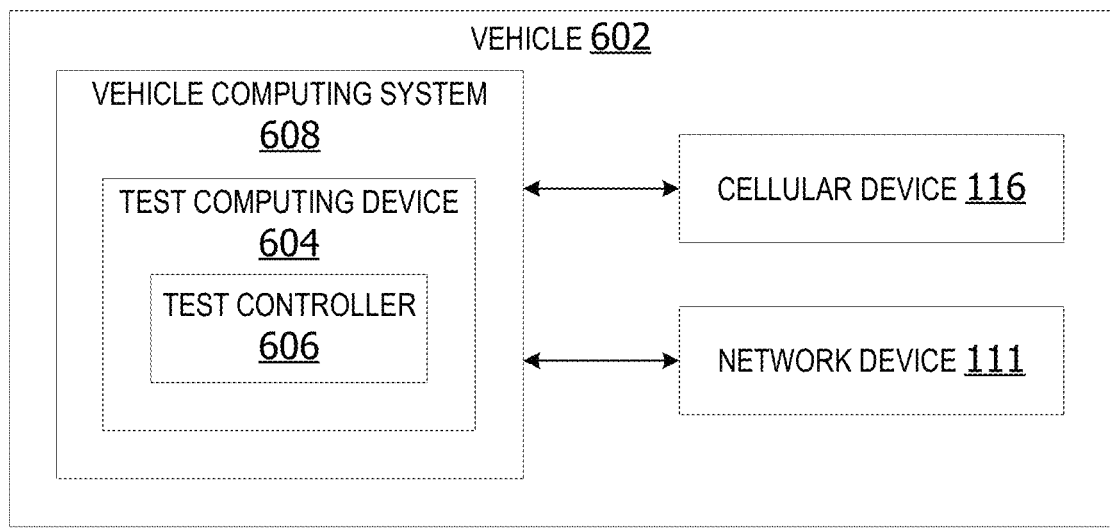
FIG. 6 is an exemplary block diagram illustrating a test computing device integrated within a vehicle computing system.

FIG. 6 is an exemplary block diagram illustrating a test computing device 604 integrated within a vehicle computing system 608 on a vehicle 602 rather than being a separate computing device, as is shown in FIG. 1 above. The test computing device 604 is the computing device running the test controller 606, such as, but not limited to, the computing device 102 in FIG. 1. The test controller 606 is a controller, such as, but not limited to, the test controller 130 in FIG. 1.

The cellular device 116 and the network device 111 remain separate devices which are placed on or within the vehicle 602 such that the cellular device and network device 111 are communicatively coupled to the test computing device 604.

Figure 7:
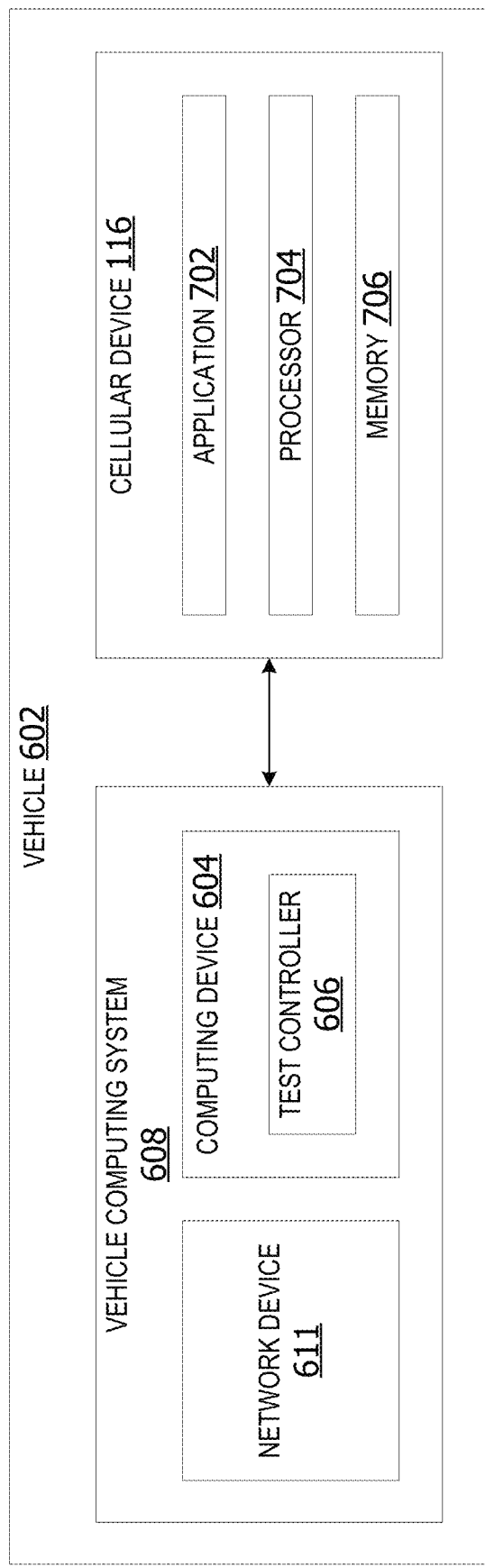
FIG. 7 is an exemplary block diagram illustrating a vehicle computing system for controlling a cellular device during performance testing.

FIG. 7 is an exemplary block diagram illustrating a vehicle computing system 608 for controlling a cellular device 116 during performance testing. In this example, the test computing device 604 running the test controller 606 is fully integrated into the vehicle computing systems 608 of the vehicle. The network device 111 in this example is also integrated into the vehicle 602. In this example, only the cellular device 116 is a separate device. The cellular device 116 incudes at least one processor communicatively coupled to a memory. The memory stores one or more applications, such as, but not limited to, the application 702. In some examples, the application 702 is a performance test application which permits the test controller 606 to access and control the cellular device 116 to power the phone off and on, initiate performance testing, and/or retrieve performance data from the cellular device 116.

Figure 8:
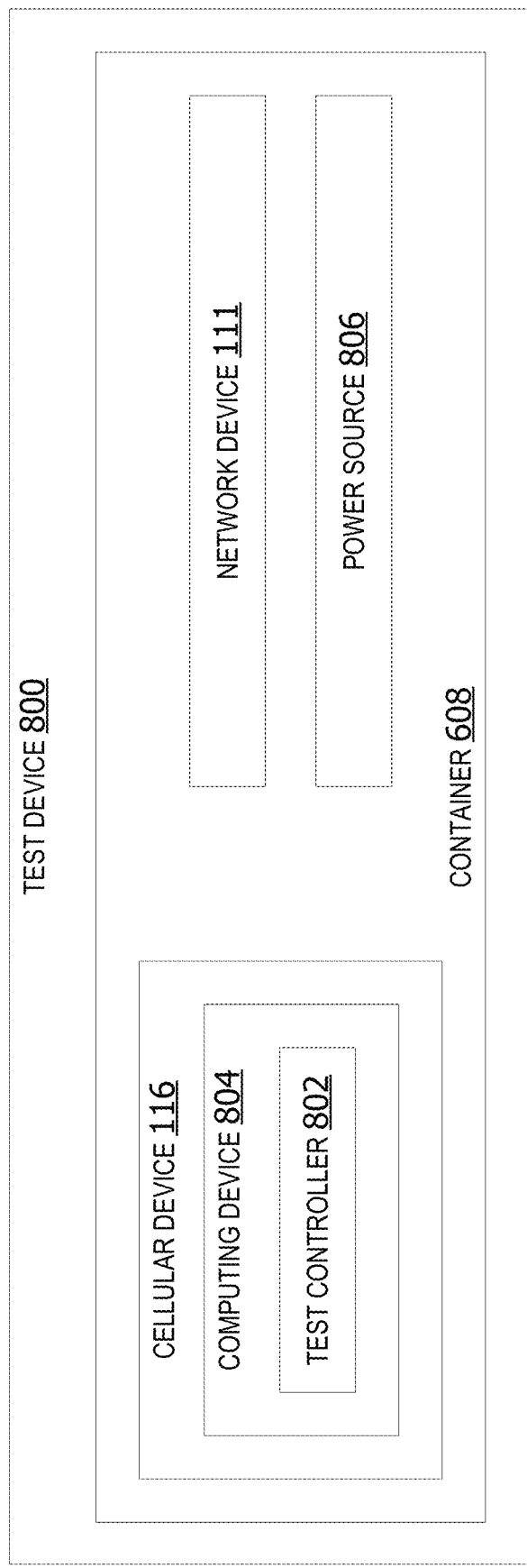
FIG. 8 is an exemplary block diagram illustrating a test controller integrated within a cellular device.

FIG. 8 is an exemplary block diagram illustrating a test controller 802 integrated within a cellular device 116. The test controller 802 is a controller, such as, but not limited to, the test controller 130 in FIG. 1.

The test controller 802 runs on a computing device 804 which is integrated into the cellular device 116 rather than being a separate computing device, as is shown in FIG. 1 above. In this example, the network device 111 remains a separate device from the vehicle and the cellular device. The cellular device 116 and the network device may be stored inside a container 808, such as a waterproof container. The power source 806 is a source of power for the test device 800, such as, but not limited to, a battery pack, a solar panel, a cigarette lighter receptacle, a universal serial bus (USB) external power port for the computing device and/or the phone, a wireless charger for phone or any other power source. In some non-limiting examples, the power source is a twelve volt (12V) standard cigarette lighter socket in a car.

Figure 9:
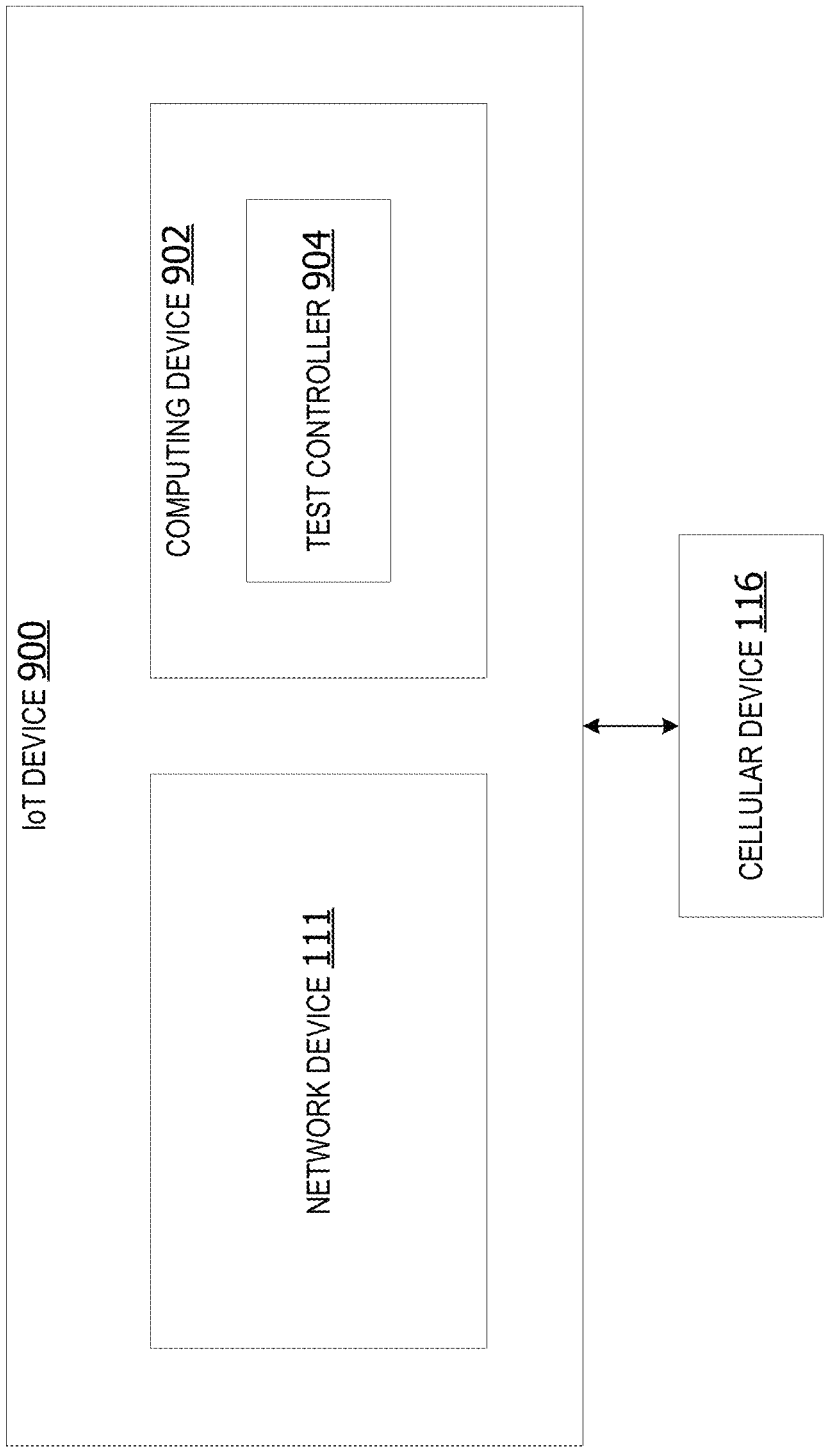
FIG. 9 is an exemplary block diagram illustrating a test controller integrated within an Internet of Things (IoT) device.

FIG. 9 is an exemplary block diagram illustrating a test controller 904 integrated within an Internet of Things (IoT) device 900. The test controller 904 is a controller, such as, but not limited to, the test controller 130 in FIG. 1.

In this example, the test device includes an IoT device 900 having a network device 111 and a computing device 902 integrated within the IoT device 900. The cellular device 116, in this example, remains a separate device from the IoT device. The IoT device 900 and the cellular device 116 form the test device in this non-limiting example.

Figure 10:
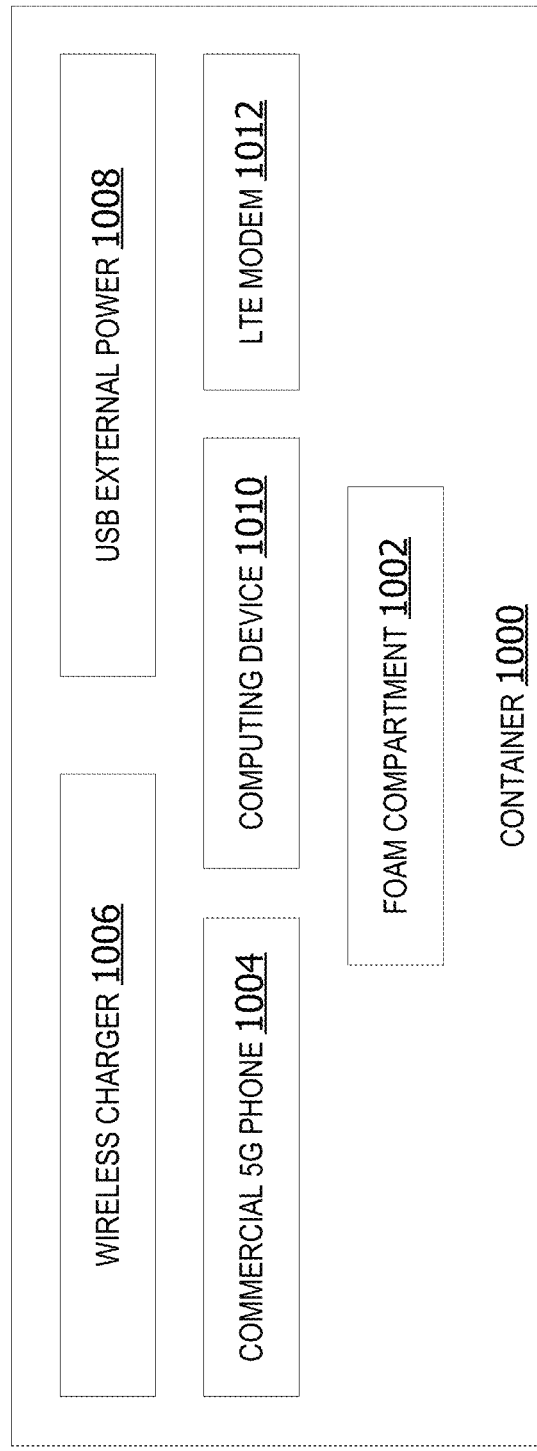
FIG. 10 is an exemplary block diagram illustrating a test device including a 5G cell phone and an LTE modem.

FIG. 10 is an exemplary block diagram illustrating a test device including a 5G cell phone and an LTE modem. In this non-limiting example, the test device includes a container 1000 having a foam compartment 1002 storing a commercial 5G phone 1004 and a wireless charger 1006 for powering the phone. A USB external power 1008 can power the commercial 5G phone, the computing device 1010 and/or the LTE modem 1012.

In some examples, the LTE modem 1012 is used to create an LTE or 5 G hotspot in an IoT device or inside a phone itself. In this manner, the system can control a Wi-Fi hotspot.

Figure 11:
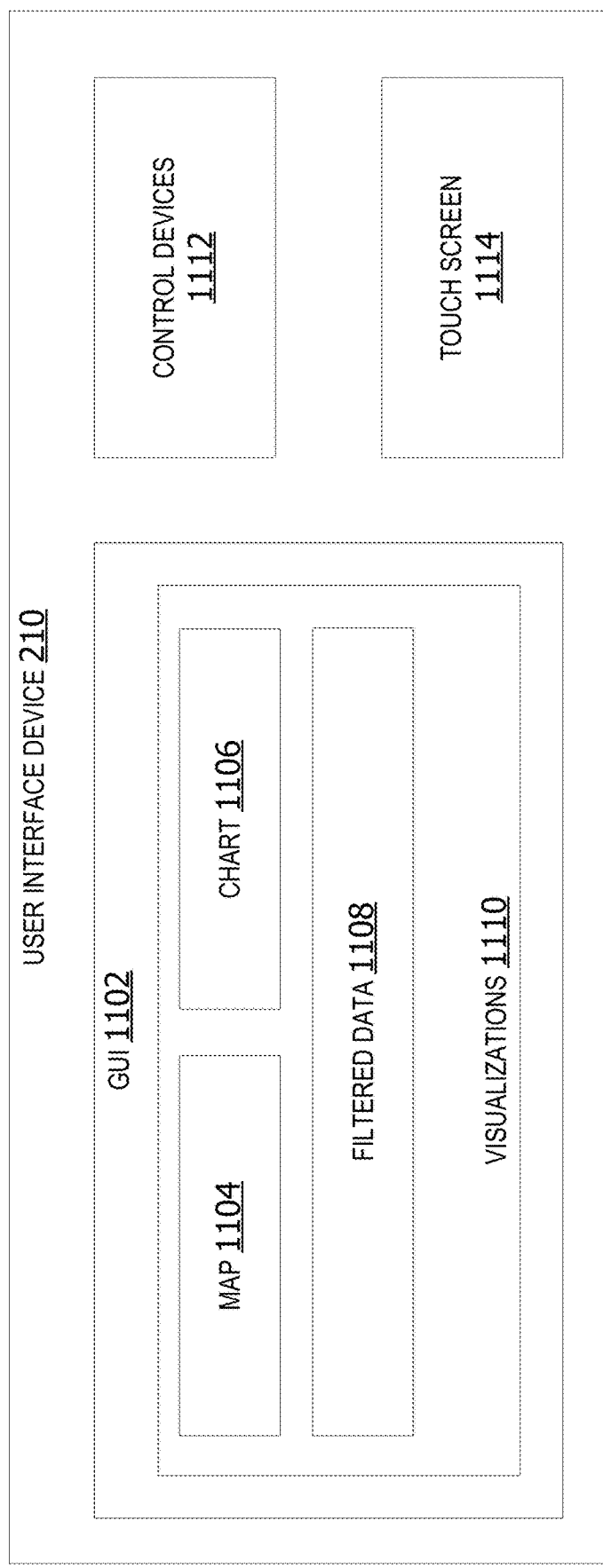
FIG. 11 is an exemplary block diagram illustrating a user interface device for displaying performance test results data and/or visualizations.

FIG. 11 is an exemplary block diagram illustrating a user interface device 210 for displaying performance test results data and/or visualizations. In some examples, the user interface device 210 is available to display performance test results to the user. The test results may be provided as visualizations 1110. A visualization is a graphical representation of data, such as, but not limited to, a map 1104, charts 1106 or any other type of visualization. The data provided in the GUI 1102 can be filtered in accordance with a campaign, an attribute, or any other filter parameter.

A set of control devices 1112 enable the user to select filters to be applied to the test data, select data associated with a selected campaign, etc. The user interface device 210 can optionally also include a touchscreen 1114 for receiving user input.

Figure 12:
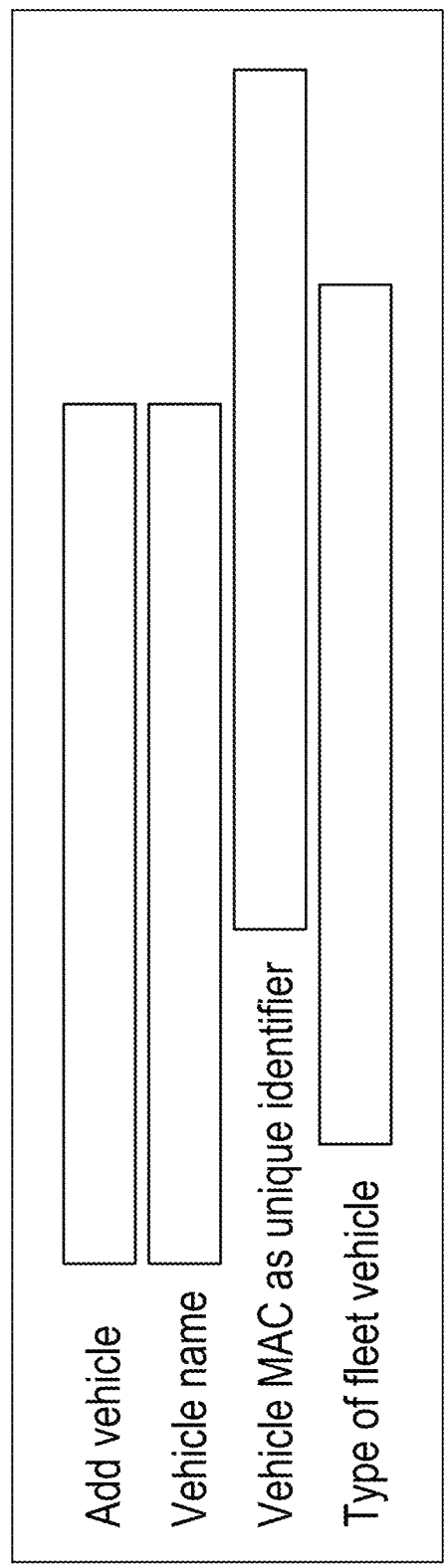
FIG. 12 is an exemplary block diagram illustrating a GUI for adding a vehicle to a fleet of vehicles available for performance testing.

FIG. 12 is an exemplary block diagram illustrating a GUI 1200 for adding a vehicle to a fleet of vehicles available for performance testing. In this non-limiting example, the GUI enables a user to add a new vehicle by providing a vehicle name, a vehicle ID, and/or a type of the vehicle. The type of the vehicle can be a delivery truck, a garbage truck, a passenger vehicle, a van, bus, ride shares, package delivery vehicles, service vehicles, municipal vehicles, etc.

The GUI 1200 provides a unique GUI for improved user interaction. The GUI 1200 provides for administration of the Fleet and the test campaigns. The GUI in some examples provides 5G test performance view.

The control GUI in other examples is a simple, yet powerful interface where the operator can control the settings of fleet vehicles, add test campaigns, tie them together and view the results. The GUI provides an interface for user's to set up vehicles, set up campaigns, run analysis on data and output maps/data visualization on GUI. The system creates an abstraction layer to define vehicles and campaigns and tie them together. The GUI interface enables a user to manage a plurality of vehicles and testing devices within geographical regions and/or across a plurality of different campaigns with test instructions that are downloaded to the test devices on the test vehicles.

Figure 13:
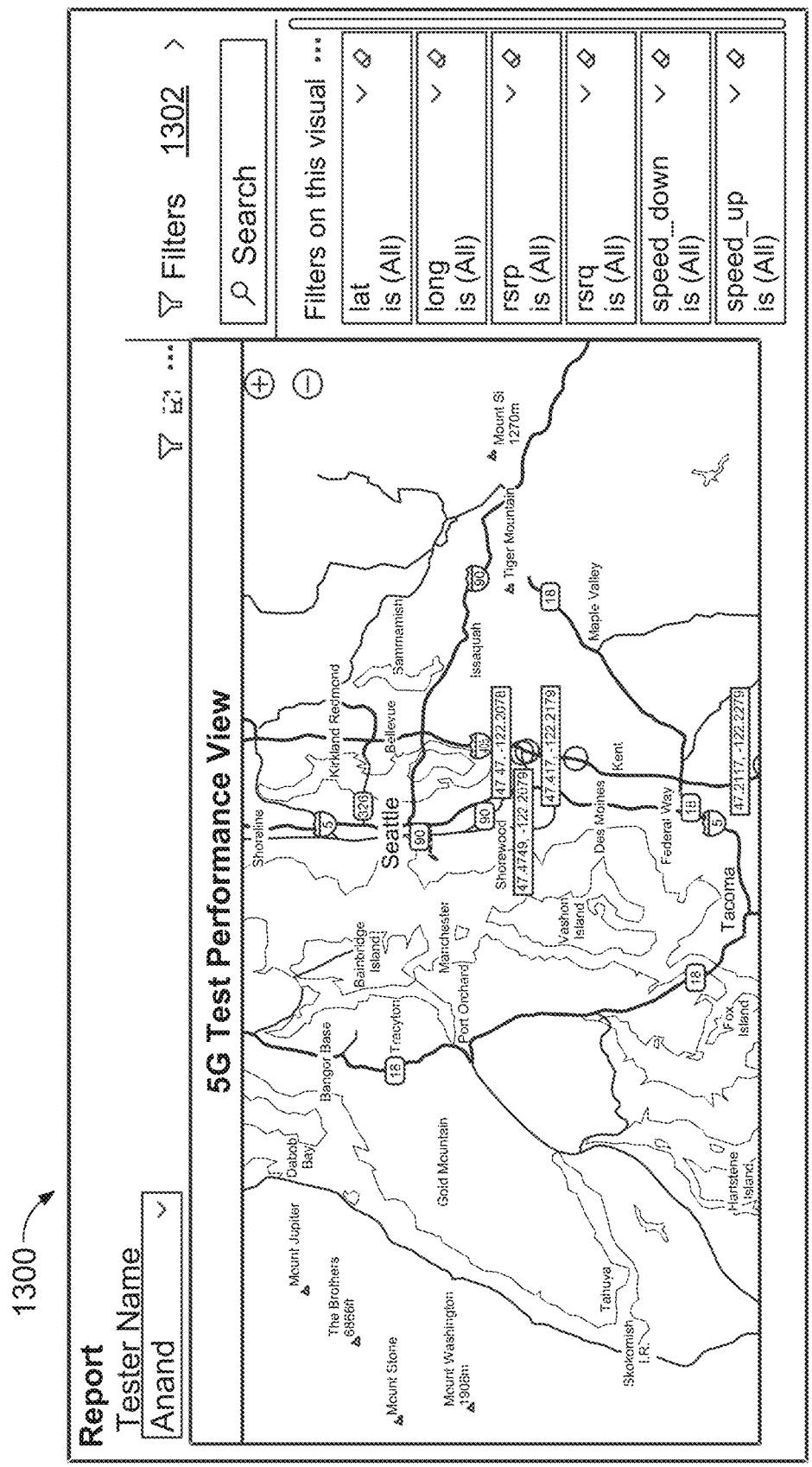
FIG. 13 is an exemplary block diagram illustrating a map visualization of the performance test data.

FIG. 13 is an exemplary block diagram illustrating a map 1300 visualization of the performance test data. The GUI can also include a set of filters 1302 for filtering the data displayed on the map or other visualization. The user can filter the test data on various parameters such as signal strength and obtained speed.

Figure 14:
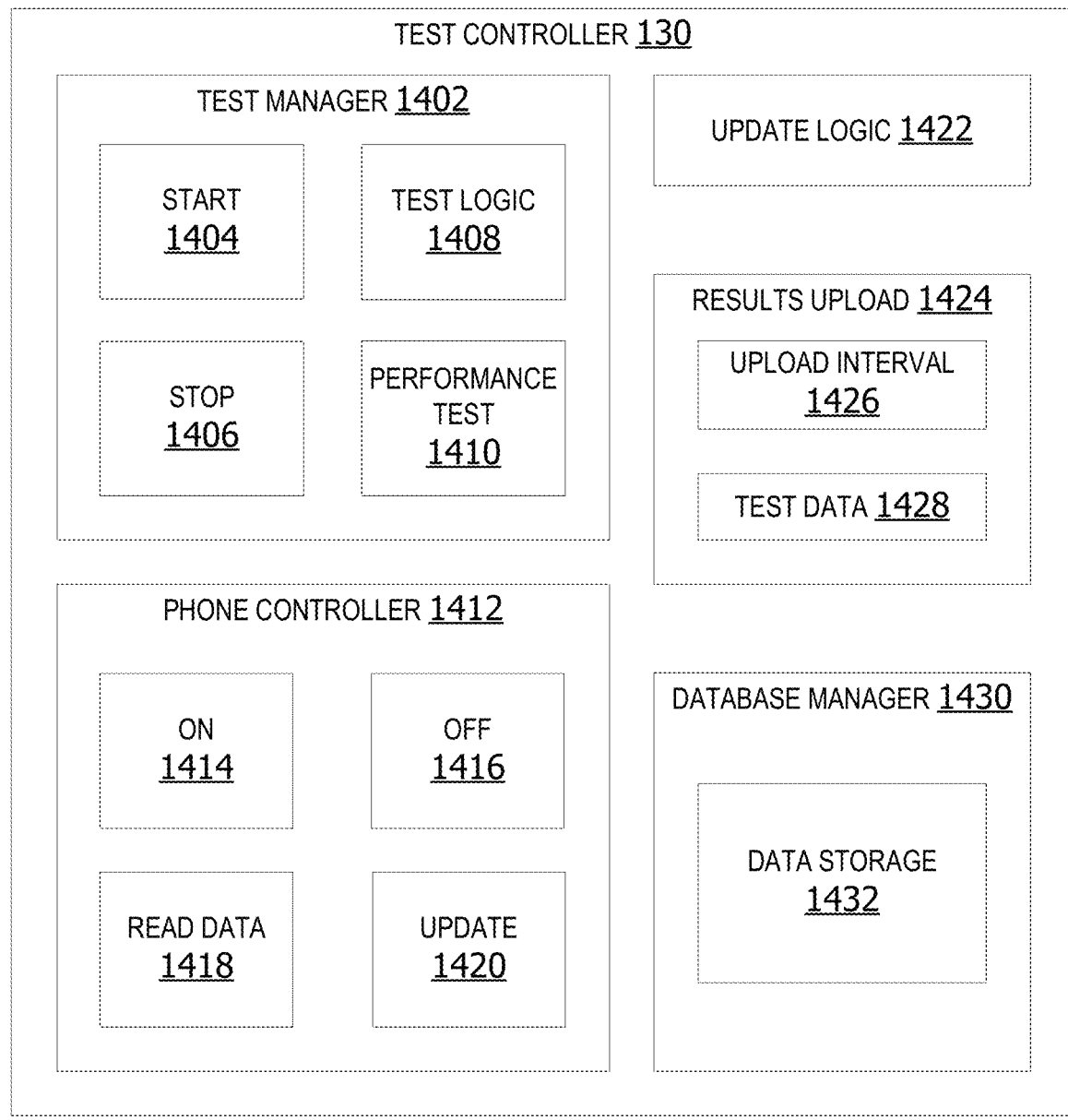
FIG. 14 is an exemplary block diagram illustrating a test controller for initiating performance testing in accordance with performance test logic.

FIG. 14 is an exemplary block diagram illustrating a test controller 130 for initiating performance testing in accordance with performance test logic. In some examples, the test controller 130 includes a test manager 1402 for managing the performance tests. The test manager can start 1404 and stop 1406 the performance test 1410 in accordance with the test logic 1408.

A phone controller 1412 is optionally provided to control a cellular device. The phone controller can turn a cellular device on 11414 and off 1416. The phone controller can read data 1418 from the cellular device and/or initiate an update 1420 of the cellular device.

Update logic 1422 controls updating of the test device. The test device updates by downloading software updates. Results upload 1424 is a software component that enables the system to upload or transmit test data 1428 at the occurrence of a predetermined event, such as, but not limited to, an upload interval 1426. The upload interval is a time-interval or time period at which data is uploaded. The upload interval is a user-configured time. The upload interval can be a thirty-minute time interval, a one-hour time interval, a two-hour time interval or any other time interval.

In some examples, the test controller 130 includes a database manager 1430 for managing data storage 1432. In this example the database manager 1430 stores data on a data storage device, such as a database or other data store as the data is being read from the cellular device and/or as the test data is being generated during the performance of a network performance test.

Figure 15:
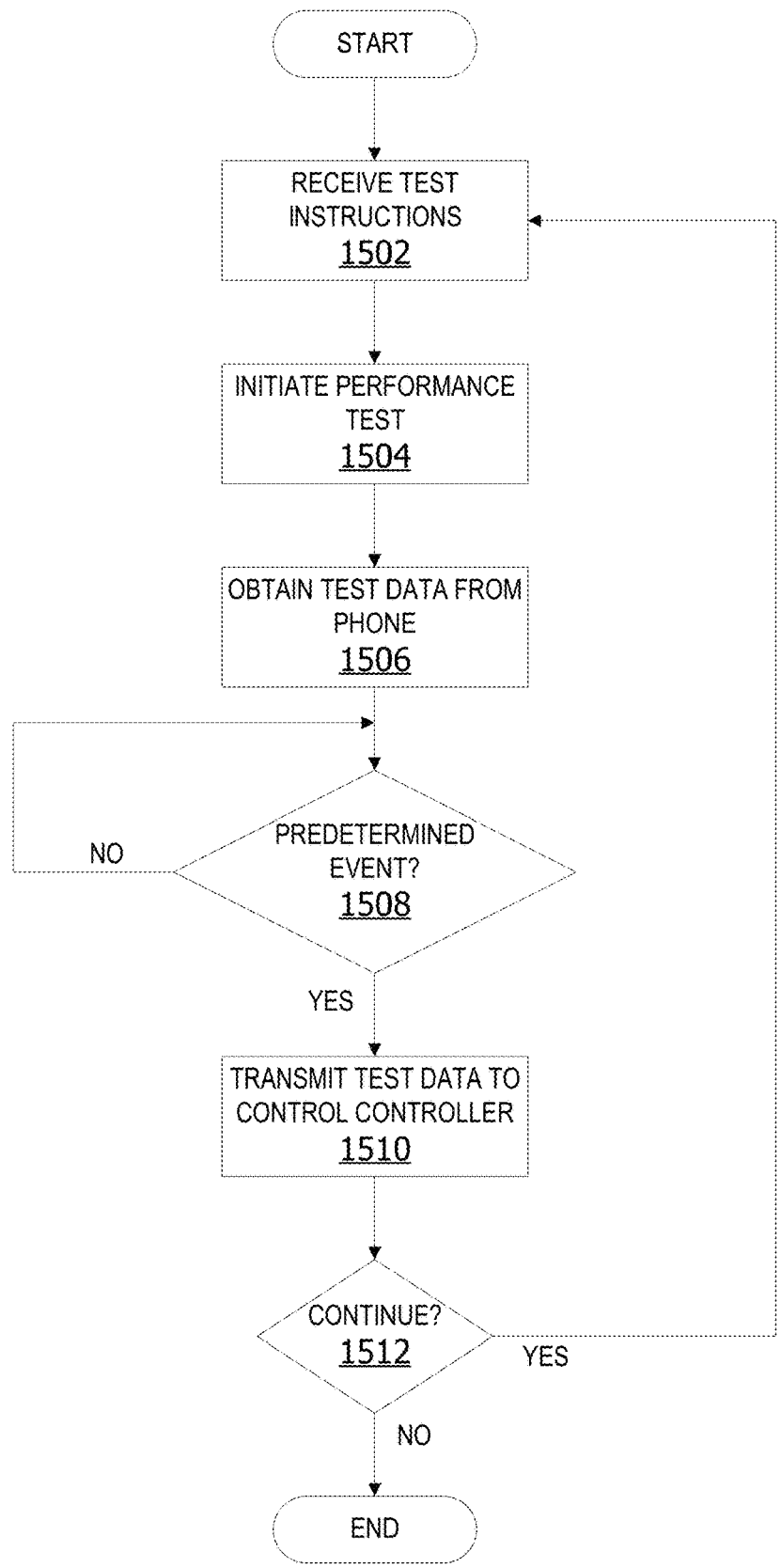
FIG. 15 is an exemplary flow chart illustrating operation of the computing device to carry out performance testing.

FIG. 15 is an exemplary flow chart illustrating operation of the computing device to carry out performance testing. The process shown in FIG. 15 is performed by a test controller, executing on a computing device, such as the computing device 102 in FIG. 1.

The process begins by receiving test instructions at 1502. The test instructions are received from a central controller running on a cloud server, such as, but not limited to, the cloud server 118 in FIG. 1. A performance test is initiated at 1504. The test is initiated by a test controller on a test device, such as, but not limited to, the test controller 130 in FIG. 1. Test data is obtained from a phone at 1506. The phone is a cellular device, such as, but not limited to, the cellular device 116 in FIG. 1. A determination is made whether a predetermined event has occurred at 1508. If yes, the test data is transmitted to a central controller at 1510. A determination is made whether to continue at 1512. If yes, the test device iteratively executes operations 1502 through 1512 until a decision is made to discontinue at 1512. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

Figure 16:
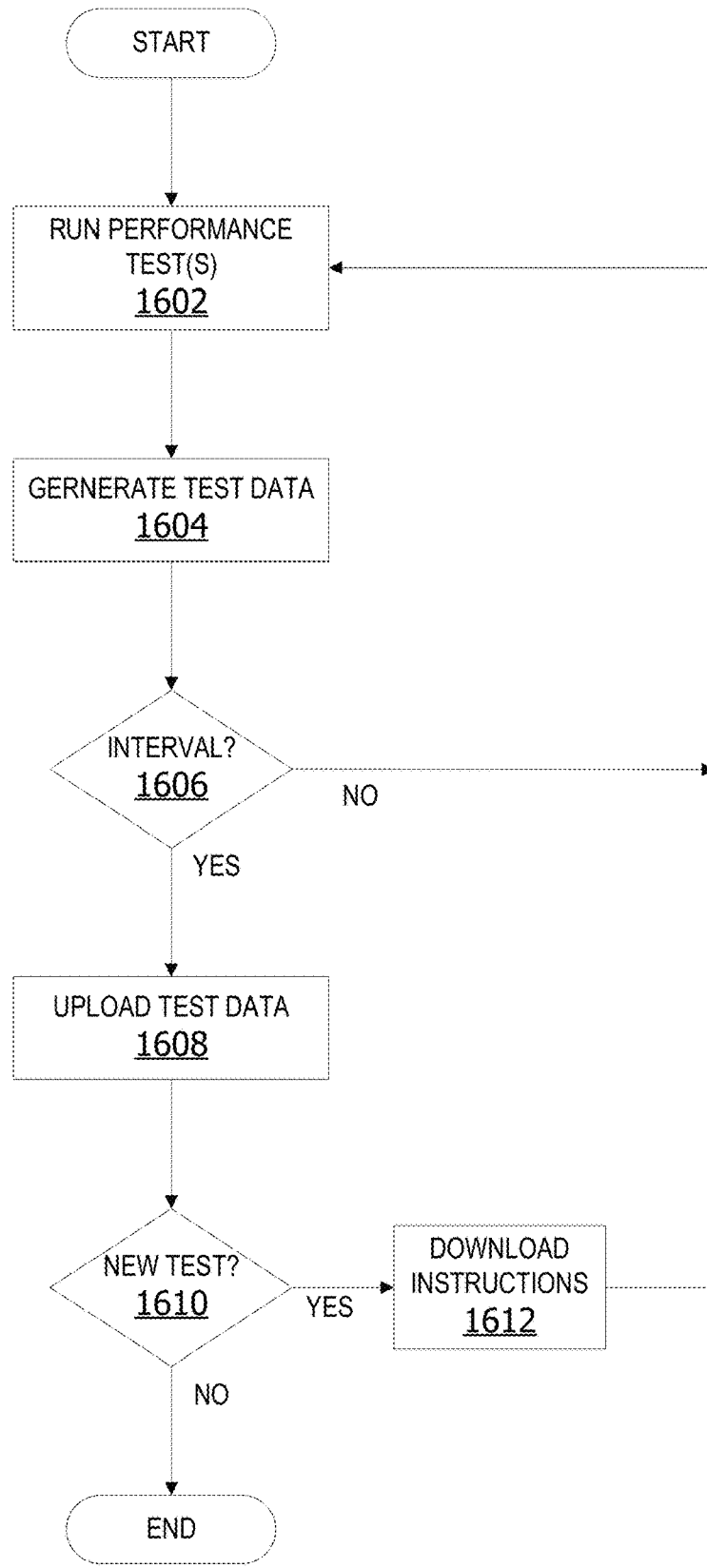
FIG. 16 is an exemplary flow chart illustrating operation of the computing device to perform network testing in accordance with test instructions.

FIG. 16 is an exemplary flow chart illustrating operation of the computing device to perform network testing in accordance with test instructions. The process shown in FIG. 16 is performed by a test controller, executing on a computing device, such as the computing device 102 in FIG. 1.

The process begins by running one or more performance test(s) at 1602. The tests are run using a cellular phone, such as, but not limited to, the cellular device 116 in FIG. 1. Test data is generated by the test device at 1604. A determination is made whether an upload interval is reached at 1606. If yes, the generated test data is uploaded (transmitted) to the central controller and/or to a data store for storage. A determination is made whether to run a new performance test at 1610. If yes, the performance test instructions are downloaded at 1612. The instructions are downloaded from the cloud server in some examples. Operations 1602 through 1612 are iteratively executed until no new tests are run at 1610. The process terminates thereafter.

While the operations illustrated in FIG. 16 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 16.

Figure 17:
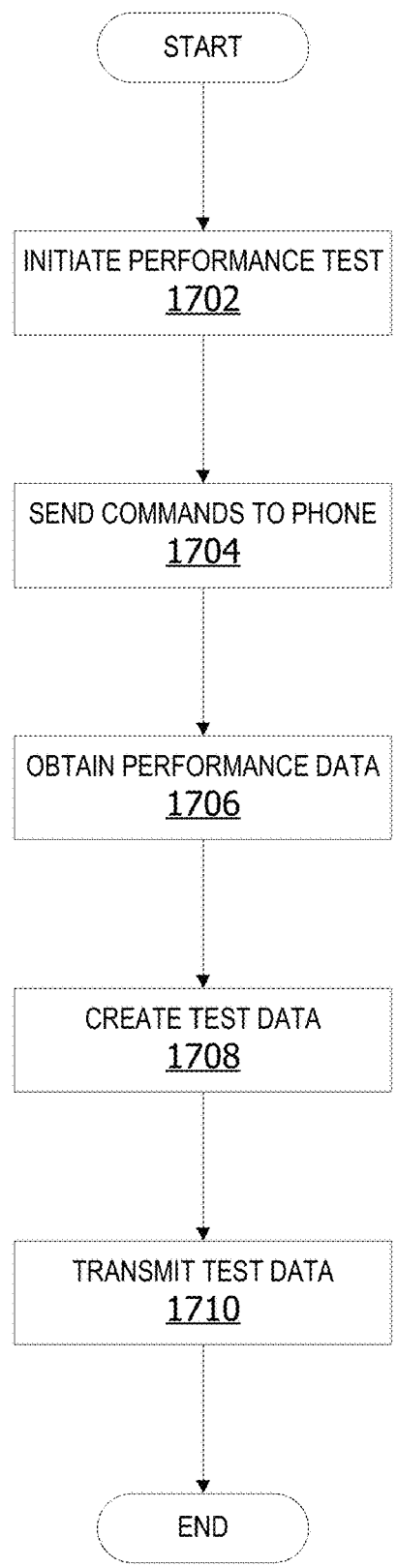
FIG. 17 is an exemplary flow chart illustrating operation of the computing device to control a cellular device during performance of network testing.

FIG. 17 is an exemplary flow chart illustrating operation of the computing device to control a cellular device during performance of network testing. The process shown in FIG. 17 is performed by a test controller, executing on a computing device, such as the computing device 102 in FIG. 1.

The process begins by initiating a performance test at 1702. Commands are sent to a phone at 1704. The commands control the phone to turn the phone on, turn it off, transmit signals, make calls, receive calls or other functions of the phone. Performance data is obtained from the phone at 1706. Test data is created based on the performance data at 1708. The test data is transmitted at 1710. The test data can be transmitted to a central controller and/or a data store. The process terminates thereafter.

While the operations illustrated in FIG. 17 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 17.

Figure 18:
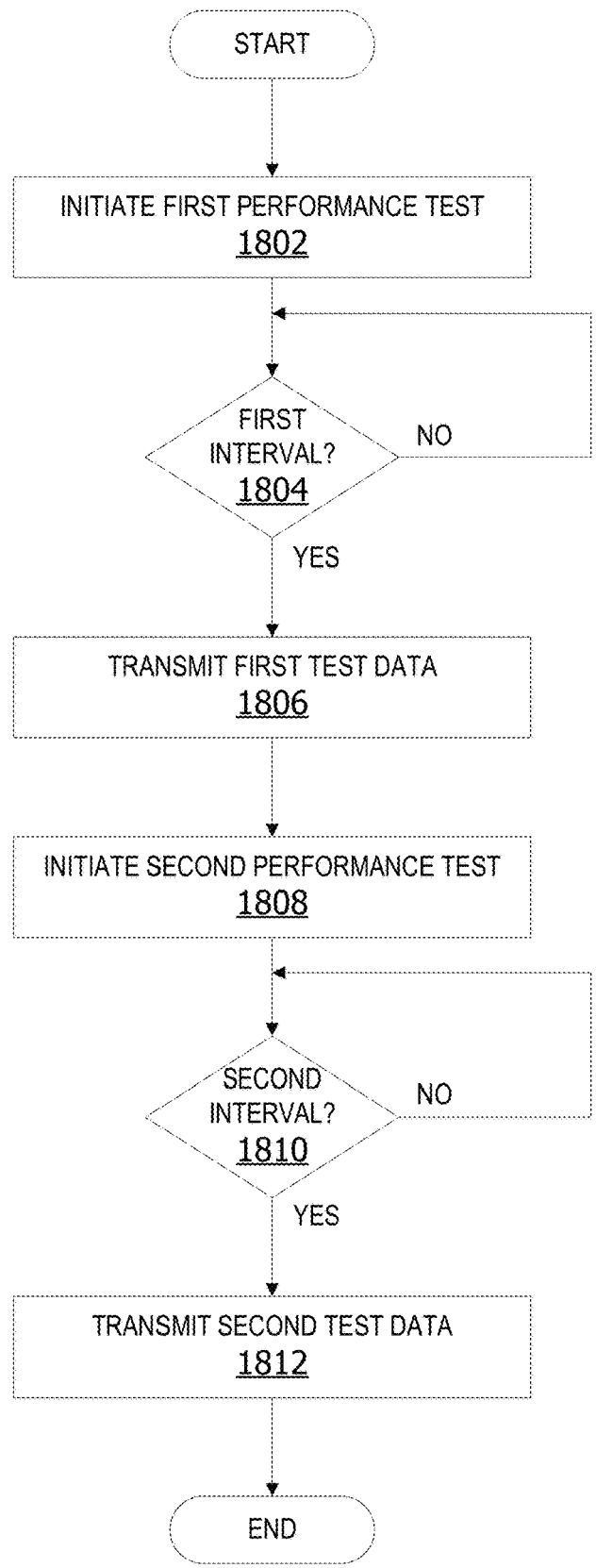
FIG. 18 is an exemplary flow chart illustrating operation of the computing device to initiating performance testing in accordance with per-campaign test logic.

FIG. 18 is an exemplary flow chart illustrating operation of the computing device to initiating performance testing in accordance with per-campaign test logic. The process shown in FIG. 18 is performed by a test controller, executing on a computing device, such as the computing device 102 in FIG. 1.

The process begins by initiating a first performance test at 1802. The first performance test is a test in accordance with a first campaign. A determination is made whether a first upload interval is reached. If yes, the first test data generated during the first performance is transmitted to the central controller and/or the data store at 1806. A second performance test is initiated at 1808. The second performance test may be a second test performed as part of the same first campaign or it can be a second test performed as part of a new (second) campaign. If a second interval is reached at 1810, the second test data generated during the second performance test is transmitted at 1812. The second interval can be the same interval as the first interval, or it can be a new (different) interval than the first interval. The process terminates thereafter.

While the operations illustrated in FIG. 18 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 18.

Figure 19:
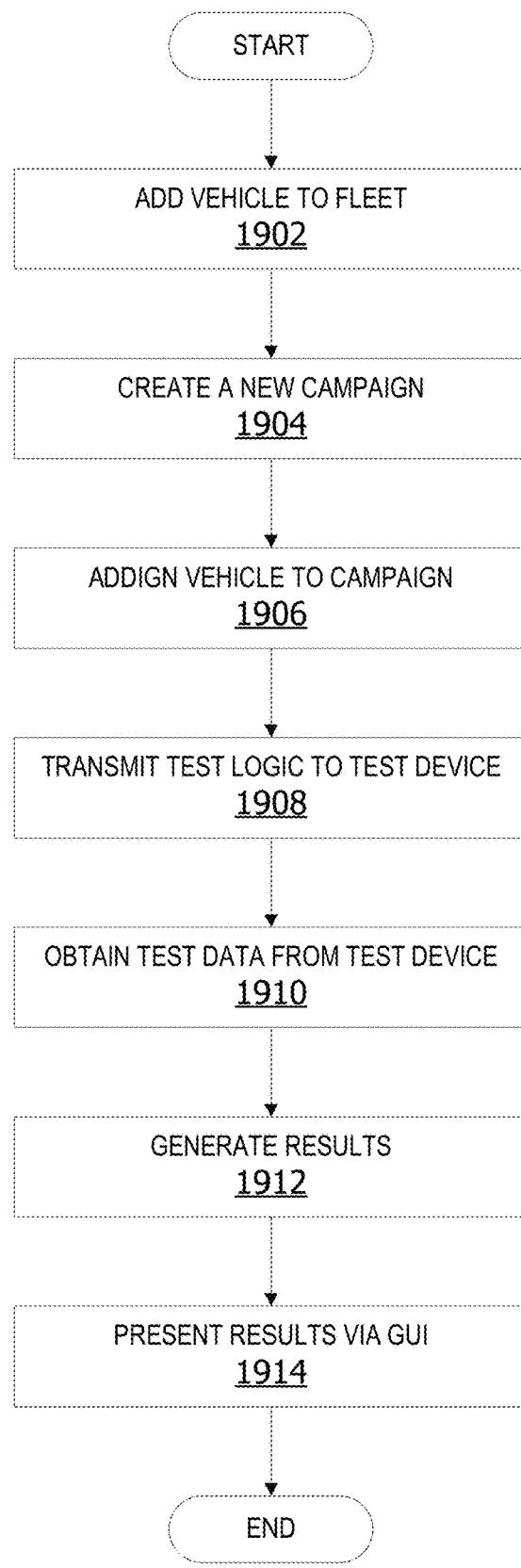
FIG. 19 is an exemplary flow chart illustrating operation of the computing device to configure a campaign.

FIG. 19 is an exemplary flow chart illustrating operation of the computing device to configure a campaign. The process shown in FIG. 19 is performed by a central controller, executing on a computing device, such as the computing device 202 in FIG. 2.

The process begins by adding a vehicle to a fleet of vehicles at 1902. The new vehicle is added in response to input received from a user via a user interface device, such as the user interface device 210 in FIG. 2. A new campaign is created at 1904. The new campaign is created based on user input received via the user interface. The added vehicle is assigned to the new campaign at 1906. The test logic for running one or more tests in accordance with the new campaign is transmitted to a test device associated with the added vehicle at 1908. The test data is obtained back from the test device associated with the vehicle at 1910. The results of the performance tests are generated at 1912. The results are presented to a user via a GUI at 1914. The process terminates thereafter.

While the operations illustrated in FIG. 19 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 19.

Figure 20:
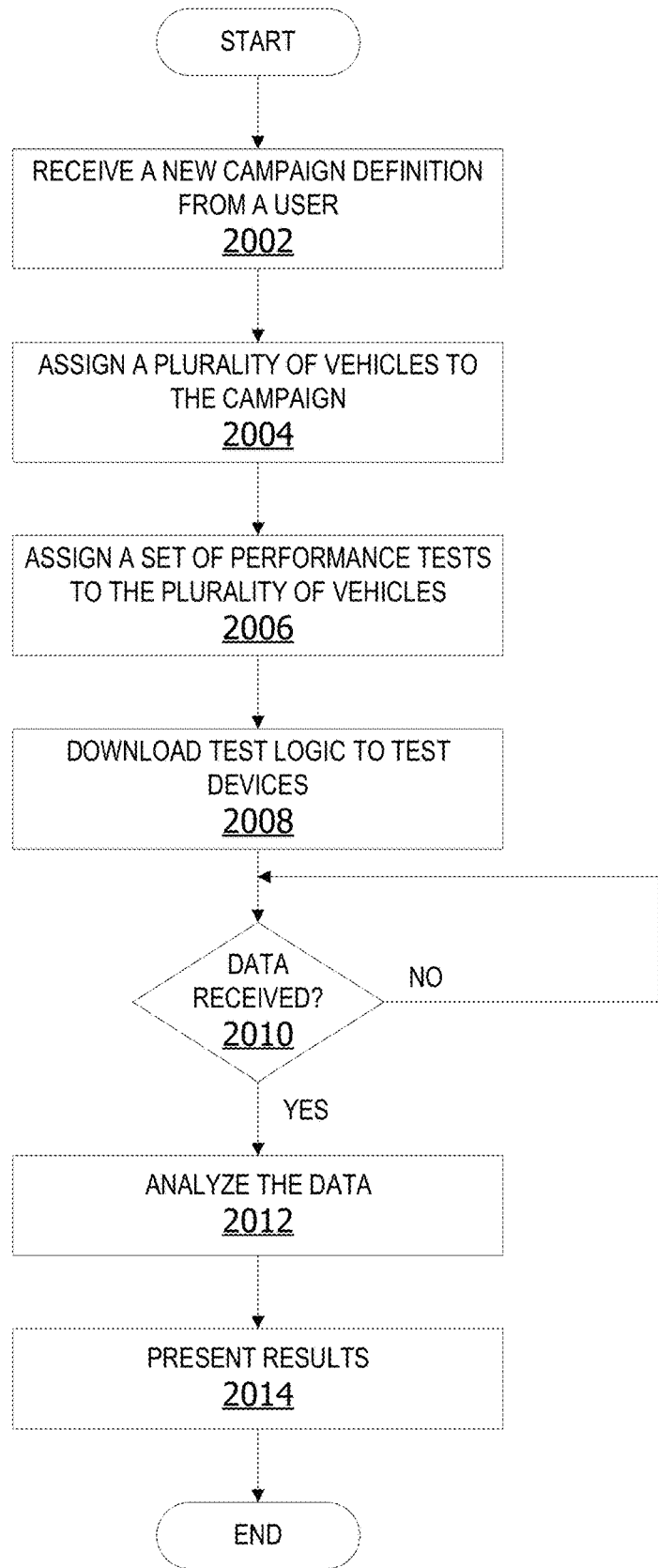
FIG. 20 is an exemplary flow chart illustrating operation of the computing device to assign a plurality of vehicles to a selected campaign.

FIG. 20 is an exemplary flow chart illustrating operation of the computing device to assign a plurality of vehicles to a selected campaign. The process shown in FIG. 20 is performed by a central controller, executing on a computing device, such as the computing device 202 in FIG. 2.

The process begins by receiving a new campaign definition from a user at 2002. A plurality of vehicles is assigned to the new campaign at 2004. A set of performance tests are assigned to the plurality of vehicles at 2006. The test logic is downloaded to test devices at 2008. A determination is made whether a data is received at 2010. If yes, the data is analyzed at 2012. The results are presented at 2014. The process terminates thereafter.

While the operations illustrated in FIG. 20 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 20.

Figure 21:
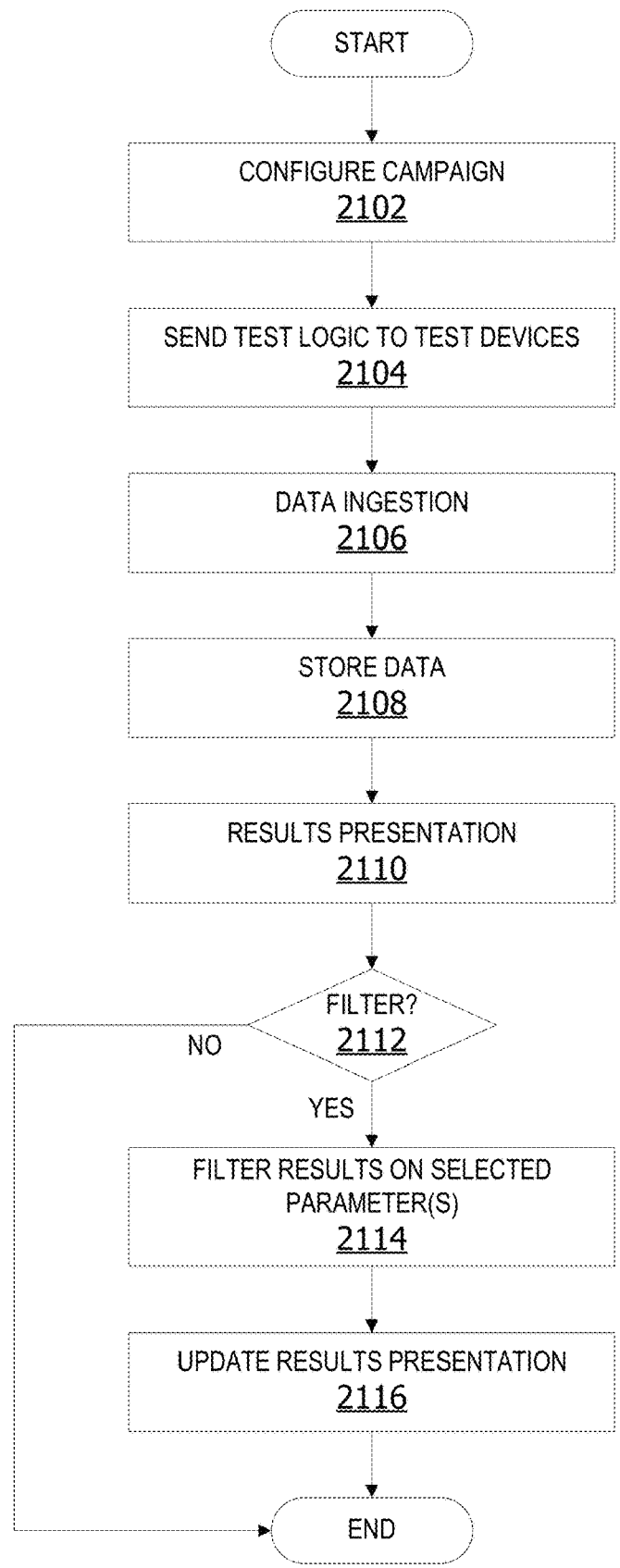
FIG. 21 is an exemplary flow chart illustrating operation of the computing device to generate and filter performance test results for presentation to a user.

FIG. 21 is an exemplary flow chart illustrating operation of the computing device to generate and filter performance test results for presentation to a user. The process shown in FIG. 21 is performed by a central controller, executing on a computing device, such as the computing device 202 in FIG. 2.

The process begins by configuring a campaign at 2102. Test logic is sent to a plurality of test devices at 2104. Data ingestion occurs at 2106. The ingested data is test data received from the test devices. The data is stored at 2108. The results are presented at 2110. A determination is made whether to filter the data at 2112. If yes, the results are filtered on one or more selected parameter(s) at 2114. The results presentation is updated based on the filter(s) at 2116. The process terminates thereafter.

While the operations illustrated in FIG. 21 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 21.

Figure 22:
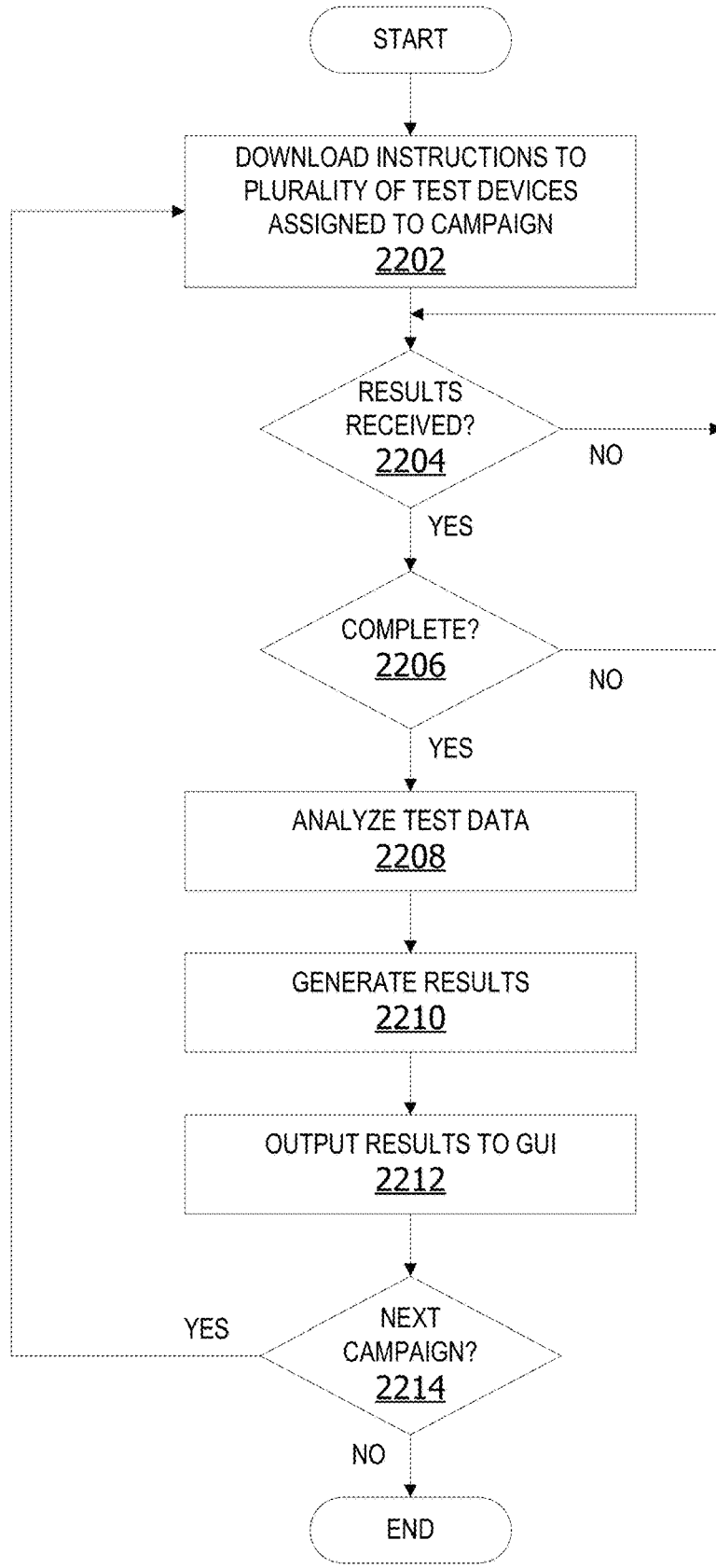
FIG. 22 is an exemplary flow chart illustrating operation of the computing device to perform network testing via a plurality of test devices.

FIG. 22 is an exemplary flow chart illustrating operation of the computing device to perform network testing via a plurality of test devices. The process shown in FIG. 22 is performed by a central controller, executing on a computing device, such as the computing device 202 in FIG. 2.

The process begins by downloading instructions to a plurality of test devices assigned to a campaign at 2202. A determination is made whether results are received at 2204. If yes, a determination is made whether the campaign performance tests are complete at 2206. If yes, the test data is analyzed at 2208. The results are output to a GUI for display at 2212. A determination is made whether there is a next campaign at 2214. If yes, the process iteratively executes operations 2202 through 2214 until there are no additional campaigns at 2214. The process terminates thereafter.

While the operations illustrated in FIG. 22 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 22.

Figure 23:
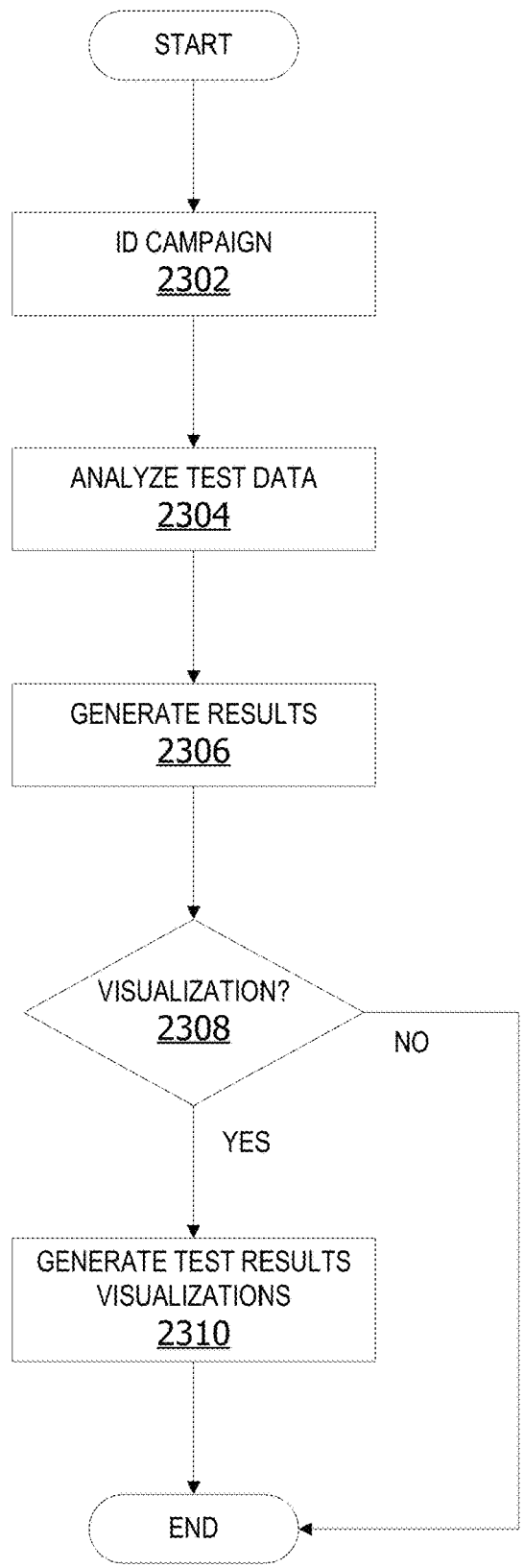
FIG. 23 is an exemplary flow chart illustrating operation of the computing device to generate a visualization of performance test results.

FIG. 23 is an exemplary flow chart illustrating operation of the computing device to generate a visualization of performance test results. The process shown in FIG. 23 is performed by a central controller, executing on a computing device, such as the computing device 202 in FIG. 2.

The process begins by identifying a campaign at 2302. Test data associated with the campaign is analyzes at 2304. Results are generated at 2306. A determination is made whether to create a visualization of the results at 2308. If yes, one or more test results visualizations are generated at 2310. The process terminates thereafter.

While the operations illustrated in FIG. 23 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 23.

ADDITIONAL EXAMPLES

In some examples, a remote-controlled automated network testing solution for network performance testing of 5G networks using a remote self-testing platform. The performance test devices are attached or installed into fleet vehicles for testing various aspects of a network. The system remotely starts performance speed tests and reads data from the test cellular device. The results are transmitted over the LTE modem.

In other examples, the test controller includes a shell script and Python® script is provided on the vehicle within the test computing device. The test controller is a self-managed system. Once it wakes up, the test computing device is preconfigured with everything it needs to communicate and download instructions for tests from the cloud server/central controller. The test device connects to the cloud, downloads performance test instructions (test logic) on what performance metrics should be measured and the user-configured upload interval.

In some examples, the central controller includes a machine learning component. The machine learning may include pattern recognition, modeling, or other machine learning algorithms to analyze performance data and/or database information to generate results, visualizations, performance alerts, including notifications and/or instructions, performance trends, and/or other patterns in performance data.

In a non-limiting example scenario, at the upload interval, the test device in a car communicates with a central controller component hosted in Azure® Cloud to upload test results and download any new test instructions on which metrics to test for during the performance testing. This is done, in some examples, over the LTE network. As the vehicle travels, a time-based job scheduler, such as a Cron® job, executes on the test computing device on the vehicle. Every upload interval, it uploads (sends) test data points to the data ingestion Node (central controller) application and these data points are stored in an Azure SQL® database. The data is uploaded to cloud. The data is sent to the performance testing (iperf) server, hosted on the cloud, to be used for speed testing.

The upload interval is a user-configured time-period. In some examples, the interval is an hourly interval in which the test data is uploaded to the central controller on the cloud server every hour. The upload occurs in the 4 G network or 5 G network into Azure® cloud.

In other examples, the test computing device communicates with the phone and modem. If the system needs to restart the phone or perform a software update, it can be triggered by the test computing device associated with the test vehicle. The system can remotely control the phone using the test computing device to turn on, to execute software update, restart, etc.

In another example, a low-powered IOT device can also be used for testing. Examples could include a CAT-M1 IoT device for tracking and locating items. These IoT devices can be used during network testing to assess performance. In context of smart vehicles having IoT devices incorporated into them, an IoT device may be used instead of a phone.

In another example, a virtual machine (VM) to host a Python-Flask Control GUI. The GUI provides a user interface for setting up campaigns and providing visualization of the performance test results. In other examples, a web application deploys a NodeJS program to ingest test data from public representational state transfer (REST) application programming interface (API) and write the test data to a data store, such as a database.

Alternatively, or in addition to the other examples described herein, examples include any combination of the following:

a data storage device that stores aggregated test data obtained from a plurality of test devices assigned to the selected test campaign, wherein each test device in the plurality of test devices performs the network performance test within the selected geographical area;

analyze, by the cloud server, aggregated test data received from a plurality of test devices associated with a plurality of vehicles assigned to the selected test campaign;

generate a performance result rating at least one attribute of the based on a result of the analysis of the aggregated test data;

a user interface device that presents a visualization of a result of the network performance test within a graphical user interface (GUI), wherein the visualization comprises a map overlaid with at least a portion of the test data;

a network device associated with the cellular device that creates a fifth generation (5G) wi-fi hotspot for utilization during performance of the network performance test;

a waterproof container comprising a test device comprising the computer-readable medium and the processor; the cellular device communicatively coupled to the test device; and a modem device communicatively coupled to the test device and the cellular device;

a plurality of vehicles within the geographical area assigned to the selected campaign;

a plurality of test devices for generating test data associated with performance of the network performance test, wherein each test device within the plurality of test devices is assigned to a vehicle within the plurality of vehicles;

a graphical user interface that enables a user to add a vehicle to a fleet of vehicles available for performance testing and assign the vehicle to the selected campaign for testing a selected attribute of the cellular network.

receiving, by a test device associated with a vehicle, performance test logic including testing instructions for running the network performance test associated with a selected test campaign;

initiating automatic performance of the network performance test via a cellular device communicatively coupled to the test device, wherein the network performance test is performed while the vehicle is moving throughout a selected geographical area;

sending at least one command to control operation of the cellular device in accordance with the testing instructions;

creating test data based on performance data obtained from the cellular device during performance of the network performance test;

transmitting the test data to a remote computing device in response to an occurrence of a per-campaign upload interval;

initiating automatic performance of a second network performance test associated with a second campaign;

obtaining second test data from the cellular device, the second test data generated during performance of the second network performance test;

transmitting the second test data to the data storage device in response to an occurrence of a second upload interval;

aggregating test data obtained from a plurality of test devices associated with a plurality of vehicles assigned to the first test campaign, wherein each test device in the plurality of test devices performs the first network performance test within the first geographical area;

analyzing, by a cloud server, aggregated test data received from a plurality of test devices associated with a plurality of vehicles assigned to the first test campaign;

generating a performance result rating at least one attribute of the cellular network performance based on a result of the analysis of the aggregated test data;

presenting, via a user interface device, a visualization of a result of the first network performance test, wherein the visualization comprises a map overlaid with filtered test data;

adding, via a GUI, a vehicle to a fleet of vehicles available for performance testing;

assigning the vehicle to the selected campaign for testing a selected attribute of the cellular network;

creating, via a GUI, a new campaign for testing a selected attribute of the cellular network;

assigning a plurality of vehicles to the new campaign;

transmitting campaign-specific testing logic, including performance test instructions for performing at least one network performance test to a plurality of test devices, each test device in the plurality of test devices is associated with each vehicle in a plurality of vehicles assigned to a selected campaign;

obtaining test data from each test device in the plurality of test devices;

analyzing the test data obtained from the plurality of test devices to generate a result;

present the result to at least one user via a GUI;

initiating a first network performance test automatically in accordance with first performance test instruction in response to receiving first performance test logic associated with a first test campaign;

transmitting first test data generated during the first network performance test to the cloud server via the cellular network in response to an occurrence of a first upload interval;

initiating a second network performance test automatically in accordance with second performance test instruction in response to receiving second performance test logic associated with a second test campaign;

transmitting the second test data to the cloud server via the cellular network in response to occurrence of a second upload interval;

aggregating test data obtained from a plurality of test devices associated with a plurality of vehicles assigned to the first test campaign, wherein each test device in the plurality of test devices performs the first network performance test within the first geographical area;

analyzing, by a cloud server, aggregated test data received from a plurality of test devices associated with a plurality of vehicles assigned to the first test campaign;

generating a performance result rating at least one attribute of the cellular network performance based on a result of the analysis of the aggregated test data;

transmitting campaign-specific testing logic, including performance test instructions for performing at least one network performance test to a plurality of test devices, each test device in the plurality of test devices is associated with each vehicle in a plurality of vehicles assigned to a selected campaign;

obtaining test data from each test device in the plurality of test devices;

analyzing the test data obtained from the plurality of test devices to generate a result; and present the result to at least one user via a GUI.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14.

In some examples, the operations illustrated in FIG. 15, FIG. 16, FIG. 17, FIG. 18, FIG. 19, FIG. 20, FIG. 21, FIG. 22, and FIG. 23 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In some examples, a cellular device, such as a phone, receives test instructions from a test controller, the instructions describing at least one performance tests to be performed via the cellular device. Upon completion of the test(s), the test results are transmitted to the test controller.

In other examples, a computer readable medium having instructions recorded thereon which when executed by a computer device cause the computer device to cooperate in performing a method of network performance testing, the method comprising receiving, by a test device associated with a vehicle, performance test logic including testing instructions for running the network performance test associated with a selected test campaign; initiating automatic performance of the network performance test via a cellular device communicatively coupled to the test device, wherein the network performance test is performed while the vehicle is moving throughout a selected geographical area; sending at least one command to control operation of the cellular device in accordance with the testing instructions; creating test data based on performance data obtained from the cellular device during performance of the network performance test; and transmitting the test data to a remote computing device in response to an occurrence of a per-campaign upload interval.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

EXEMPLARY OPERATING ENVIRONMENT

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for network performance testing. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13 and FIG. 14, such as when encoded to perform the operations illustrated in FIG. 15, FIG. 16, FIG. 17, FIG. 18, FIG. 19, FIG. 20, FIG. 21, FIG. 22 and FIG. 23, constitute exemplary means for initiating a first network performance test automatically in accordance with first performance test instruction in response to receiving first performance test logic associated with a first test campaign; exemplary means for transmitting first test data generated during the first network performance test to the cloud server via the cellular network in response to an occurrence of a first upload interval; exemplary means for initiating a second network performance test automatically in accordance with second performance test instruction in response to receiving second performance test logic associated with a second test campaign; and exemplary means for transmitting the second test data to the cloud server via the cellular network in response to occurrence of a second upload interval.

Other non-limiting examples provide one or more computer storage devices having a first computer-executable instructions stored thereon for providing automated network performance testing. When executed by a computer, the computer performs operations including receiving campaign-specific performance test instructions from a cloud server, the performance test instructions comprising instructions for running a network performance test associated with a selected test campaign; automatically initiating the network performance test using the cellular device in accordance with the performance test instructions; obtaining test data generated during performance of the network performance test within a selected geographical area from the cellular device; transmitting the test data to the cloud server via the cellular telephone network in response to an occurrence of a predetermined event, wherein the cloud server automatically evaluates an aspect of the cellular telephone network performance based on an analysis of the test data.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of" or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for network performance testing, the system comprising:
   a processor communicatively coupled to a cellular device for transmitting and receiving communications via a cellular network, wherein computer-readable instructions on the processor are operative upon execution by the processor to:
   receive performance test instructions from a cloud server, the performance test instructions comprising instructions for running a network performance test associated with a selected test campaign;
   automatically initiate the network performance test using the cellular device in accordance with the performance test instructions;
   obtain test data generated during performance of the network performance test within a selected geographical area from the cellular device; and
   transmit the test data to the cloud server via the cellular network in response to an occurrence of a predetermined event, wherein the test data is presented to a user via a user interface device, and wherein the cloud server analyzes aggregated test data received from a plurality of test devices associated with a plurality of vehicles assigned to the selected test campaign and generates a performance result rating at least one attribute of cellular network performance based on a result of the analysis of the aggregated test data.

2. The system of claim 1, further comprising:
   a data storage device that stores the aggregated test data obtained from the plurality of test devices assigned to the selected test campaign, wherein each test device in the plurality of test devices performs the network performance test within the selected geographical area.

3. The system of claim 1, wherein each vehicle in the plurality of vehicles includes an individual test device from the plurality of test devices.

4. The system of claim 1, further comprising:
   a graphical user interface (GUI) associated with the user interface device that presents a visualization of a result of the network performance test within the GUI, wherein the visualization comprises a map overlaid with at least a portion of the test data.

5. The system of claim 1, further comprising:
   a network device associated with the cellular device that creates a fifth generation (5G) wi-fi hotspot for utilization during performance of the network performance test.

6. The system of claim 1, further comprising:
   a waterproof container comprising:
   a test device comprising a computer-readable medium and the processor;
   the cellular device communicatively coupled to the test device; and
   a modem device communicatively coupled to the test device and the cellular device.

7. The system of claim 1, wherein the computer-readable instructions on the processor are operative upon execution by the processor to further:
   receive campaign-specific testing logic, including the performance test instructions for performing the network performance test, wherein the campaign-specific testing logic is obtained from a central controller by the plurality of test devices assigned to the selected test campaign, each test device in the plurality of test devices providing individual test data to the central controller for analysis to generate a test result.

8. The system of claim 1, further comprising:
a graphical user interface that enables a user to add a vehicle to a fleet of vehicles available for performance testing and assign the vehicle to the selected test campaign for testing a selected attribute of the cellular network.

9. A method for network performance testing, the method comprising:
receiving, by at least one test device associated with a vehicle, performance test logic including testing instructions for running a network performance test associated with a selected test campaign;
initiating automatic performance of the network performance test via a cellular device communicatively coupled to the at least one test device, wherein the network performance test is performed while the vehicle is moving throughout a selected geographical area;
sending at least one command to control operation of the cellular device in accordance with the testing instructions;
creating test data based on performance data obtained from the cellular device during performance of the network performance test;
transmitting the test data to a remote computing device in response to an occurrence of a per-campaign upload interval, wherein the test data is aggregated with other test data obtained from a plurality of test devices assigned to the selected test campaign, the plurality of test devices associated with a plurality of vehicles performing the selected test campaign within the selected geographical area, and wherein the aggregated test data is analyzed by a cloud server to generate a performance result rating at least one attribute of cellular network performance based on a result of analysis of the aggregated test data.

10. The method of claim 9, wherein the per-campaign upload interval is a first upload interval and further comprising:
initiating automatic performance of a second network performance test associated with a second campaign;
obtaining second test data from the cellular device, the second test data generated during performance of the second network performance test; and
transmitting the second test data to a data storage device in response to an occurrence of a second upload interval.

11. The method of claim 9, wherein the test data is analyzed to identify at least one of network outages, signal strength, speed, signal to noise ratio, and location data.

12. The method of claim 9, further comprising:
receiving campaign-specific testing logic, including performance test instructions for performing the network performance test, wherein the campaign-specific testing logic is obtained from a central controller by the plurality of test devices assigned to the selected test campaign, each test device in the plurality of test devices providing individual test data to the central controller for analysis to generate a test result.

13. The method of claim 9, further comprising:
presenting, via a user interface device, a visualization of a result of the network performance test, wherein the visualization comprises a map overlaid with filtered test data.

14. The method of claim 9, further comprising:
adding, via a GUI, a vehicle to a fleet of vehicles available for performance testing; and
assigning the vehicle to the selected test campaign for testing a selected attribute of a cellular network.

15. The method of claim 9, further comprising:
creating, via a GUI, a new campaign for testing a selected attribute of a cellular network; and
assigning a plurality of vehicles to the new campaign.

16. The method of claim 12, wherein
the generated test result is presented by the central controller to at least one user via a GUI.

17. One or more computer storage devices having computer-executable instructions for network performance testing that, upon execution by a processor, cause the processor to perform operations comprising:
initiating a first network performance test automatically via a cellular device in accordance with first performance test instruction in response to receiving first performance test logic associated with a test device for a vehicle assigned to a first test campaign;
transmitting first test data generated during the first network performance test to a cloud server via a cellular network in response to an occurrence of a first upload interval, wherein the first test data is aggregated with test data obtained from a plurality of test devices associated with a plurality of vehicles assigned to the first test campaign within a first geographical area, and wherein the aggregated test data is analyzed by a cloud server to generate a performance result rating at least one attribute of cellular network performance based on a result of analysis of the aggregated test data;
receiving reassignment of the vehicle to a second test campaign;
initiating a second network performance test automatically in accordance with second performance test instruction in response to receiving second performance test logic associated with the second test campaign; and
transmitting second test data to the cloud server via the cellular network in response to occurrence of a second upload interval.

18. The one or more computer storage devices of claim 17, wherein the first performance test logic and the second performance test logic are received from a central controller, the central controller transmitting the first performance test logic to each test device in the plurality of test devices assigned to the first test campaign and transmitting the second performance test logic to individual test devices in another plurality of test devices assigned to the second test campaign.

19. The one or more computer storage devices of claim 17, wherein the operations further comprise:
presenting, via a user interface device, a visualization of a result of the network performance test, wherein the visualization comprises a map overlaid with filtered test data.

20. The one or more computer storage devices of claim 18, wherein the central controller obtains test data from each test device in the plurality of test devices, analyzes the test data obtained from the plurality of test devices, and generates a result, the result presented to at least one user via a GUI.

* * * * *